US012561353B1

(12) United States Patent
Donlan et al.

(10) Patent No.: US 12,561,353 B1
(45) Date of Patent: Feb. 24, 2026

(54) NATURAL LANGUAGE SEARCH AND KNOWLEDGE MANAGEMENT USING DEEP LEARNING

(71) Applicant: Truist Bank, Charlotte, NC (US)

(72) Inventors: Matthew Laine Donlan, Charlotte, NC (US); Alka Nagar, Atlanta, GA (US); Sweta Sharan, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 19/007,620

(22) Filed: Jan. 2, 2025

(51) Int. Cl.
*G06F 16/3329* (2025.01)
*G06F 16/3331* (2025.01)

(52) U.S. Cl.
CPC .... *G06F 16/33295* (2025.01); *G06F 16/3331* (2019.01)

(58) Field of Classification Search
CPC .............................................. G06F 16/33295
See application file for complete search history.

(56) References Cited

U.S. PATENT DOCUMENTS

| | | | | |
|---|---|---|---|---|
| 2015/0286747 A1* | 10/2015 | Anastasakos | ....... | G06F 16/9535 707/776 |
| 2024/0303235 A1* | 9/2024 | Kulkarni | ........... | G06F 16/24522 |
| 2024/0386039 A1* | 11/2024 | Noorizadeh | ........ | G06F 16/3329 |

* cited by examiner

*Primary Examiner* — Van H Oberly
(74) *Attorney, Agent, or Firm* — Michael A. Springs, Esq.; Shumaker, Loop & Kendrick, LLP; Patrick B. Horne

(57) ABSTRACT

An application executing on a processor may receive a natural language request. A large language model (LLM) may determine, for each of a plurality of data sources, a respective data source configuration. The LLM may generate, for each data source, a respective query based on the natural language request and the data source configuration. The application may, based on the configuration, process the queries against the plurality of data sources. The LLM may receive, based on the processing, a plurality of results from the plurality of data sources and generate a natural language response to the natural language request. The natural language response may include an indication of a first result of the plurality of results. The application may output the natural language response for display.

20 Claims, 14 Drawing Sheets

Figure 3A:
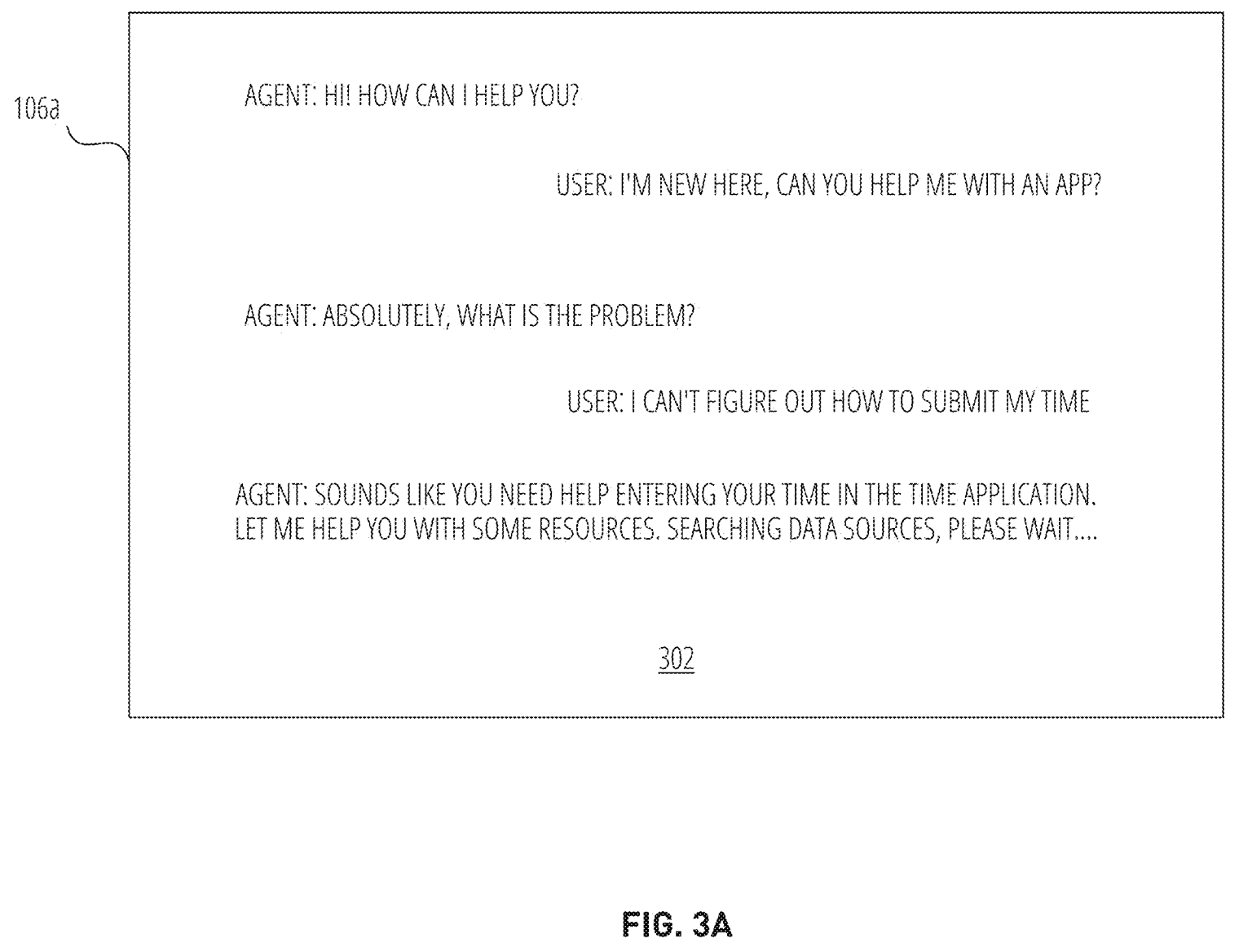

106a

AGENT: HI! HOW CAN I HELP YOU?

USER: I'M NEW HERE, CAN YOU HELP ME WITH AN APP?

AGENT: ABSOLUTELY, WHAT IS THE PROBLEM?

USER: I CAN'T FIGURE OUT HOW TO SUBMIT MY TIME

AGENT: SOUNDS LIKE YOU NEED HELP ENTERING YOUR TIME IN THE TIME APPLICATION. LET ME HELP YOU WITH SOME RESOURCES. SEARCHING DATA SOURCES, PLEASE WAIT....

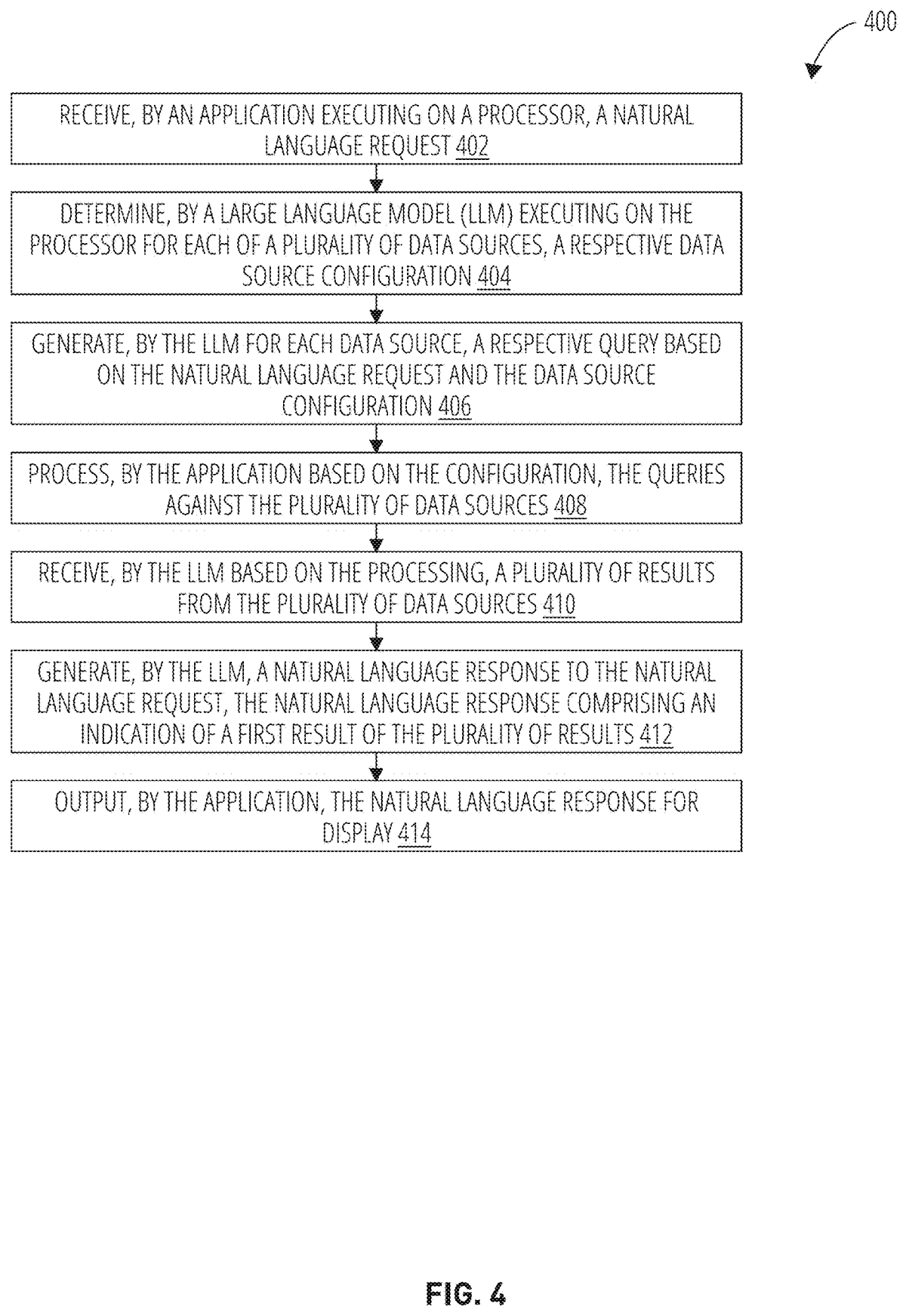

RECEIVE, BY AN APPLICATION EXECUTING ON A PROCESSOR, A NATURAL LANGUAGE REQUEST 402

↓

DETERMINE, BY A LARGE LANGUAGE MODEL (LLM) EXECUTING ON THE PROCESSOR FOR EACH OF A PLURALITY OF DATA SOURCES, A RESPECTIVE DATA SOURCE CONFIGURATION 404

↓

GENERATE, BY THE LLM FOR EACH DATA SOURCE, A RESPECTIVE QUERY BASED ON THE NATURAL LANGUAGE REQUEST AND THE DATA SOURCE CONFIGURATION 406

↓

PROCESS, BY THE APPLICATION BASED ON THE CONFIGURATION, THE QUERIES AGAINST THE PLURALITY OF DATA SOURCES 408

↓

RECEIVE, BY THE LLM BASED ON THE PROCESSING, A PLURALITY OF RESULTS FROM THE PLURALITY OF DATA SOURCES 410

↓

GENERATE, BY THE LLM, A NATURAL LANGUAGE RESPONSE TO THE NATURAL LANGUAGE REQUEST, THE NATURAL LANGUAGE RESPONSE COMPRISING AN INDICATION OF A FIRST RESULT OF THE PLURALITY OF RESULTS 412

↓

OUTPUT, BY THE APPLICATION, THE NATURAL LANGUAGE RESPONSE FOR DISPLAY 414

FIG. 4

NATURAL LANGUAGE SEARCH AND KNOWLEDGE MANAGEMENT USING DEEP LEARNING

BACKGROUND

Natural Language Processing (NLP) is a field of computer science and artificial intelligence that focuses on the interaction between computers and human language. NLP enables computers to understand, interpret, and generate human language in a way that is both meaningful and useful.

Large Language Models (LLMs) are advanced AI models that have been trained on vast amounts of text data to understand and generate human-like text. One of the challenges associated with generating responses from natural language requests using LLMs is ensuring the accuracy and relevance of the responses. This challenge arises due to the complex nature of human language, including ambiguity, context, and the need for nuanced understanding. Developers and researchers continually work to improve the capabilities of LLMs to address these challenges and provide more accurate and helpful responses.

BRIEF SUMMARY

Shortcomings of the prior art are overcome, and additional advantages are provided through the provision of a computing system for natural language search and knowledge management using deep learning.

In various embodiments, a method can be implemented to handle a natural language request. This method involves executing a sequence of steps starting with the application receiving the request, followed by a large language model (LLM) determining a configuration for each of multiple data sources. The LLM then generates a plurality of queries based on the request. After processing the queries against these data sources, the LLM receives results from each source and generates a natural language response, highlighting a specific result. Finally, the application displays the response.

In another embodiment, a non-transitory computer-readable storage medium contains instructions that, when executed by a processor, replicate the method. The processor receives a natural language request, and the LLM determines a configuration for each data source. The LLM then generates a plurality of queries based on this request. For each data source, the LLM processes the respective query and receives results. The LLM then generates a natural language response indicating a result, which is displayed by the application.

An apparatus comprising a processor and a memory storing instructions can also perform the method. The processor receives a natural language request, and the LLM determines a configuration for each data source. The LLM then generates a plurality of queries, respective ones of the queries associated with respective ones of the data sources. The processor processes the queries against the associated data source, and receives results. The LLM generates a natural language response with an indication of a result, which the processor outputs for display.

The features, functions, and advantages that have been described herein may be achieved independently in various embodiments of the present disclosure including computer-implemented methods, computer program products, and computing systems or may be combined in yet other embodiments, further details of which can be seen with reference to the following description and drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
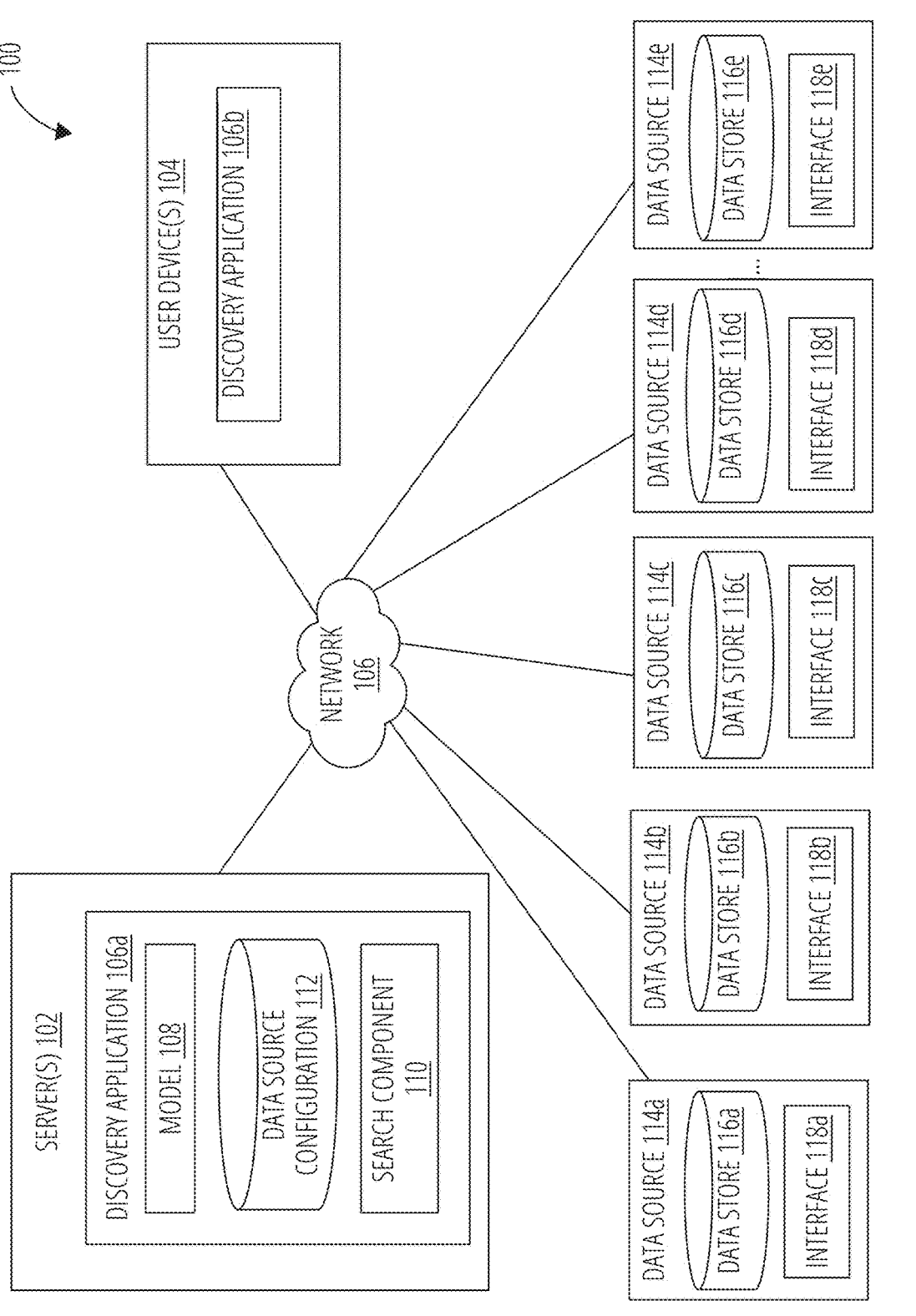

Having thus described embodiments in general terms, reference will now be made to the accompanying drawings, wherein:

FIG. 1 illustrates an aspect of the subject matter in accordance with one embodiment.

Figure 2:
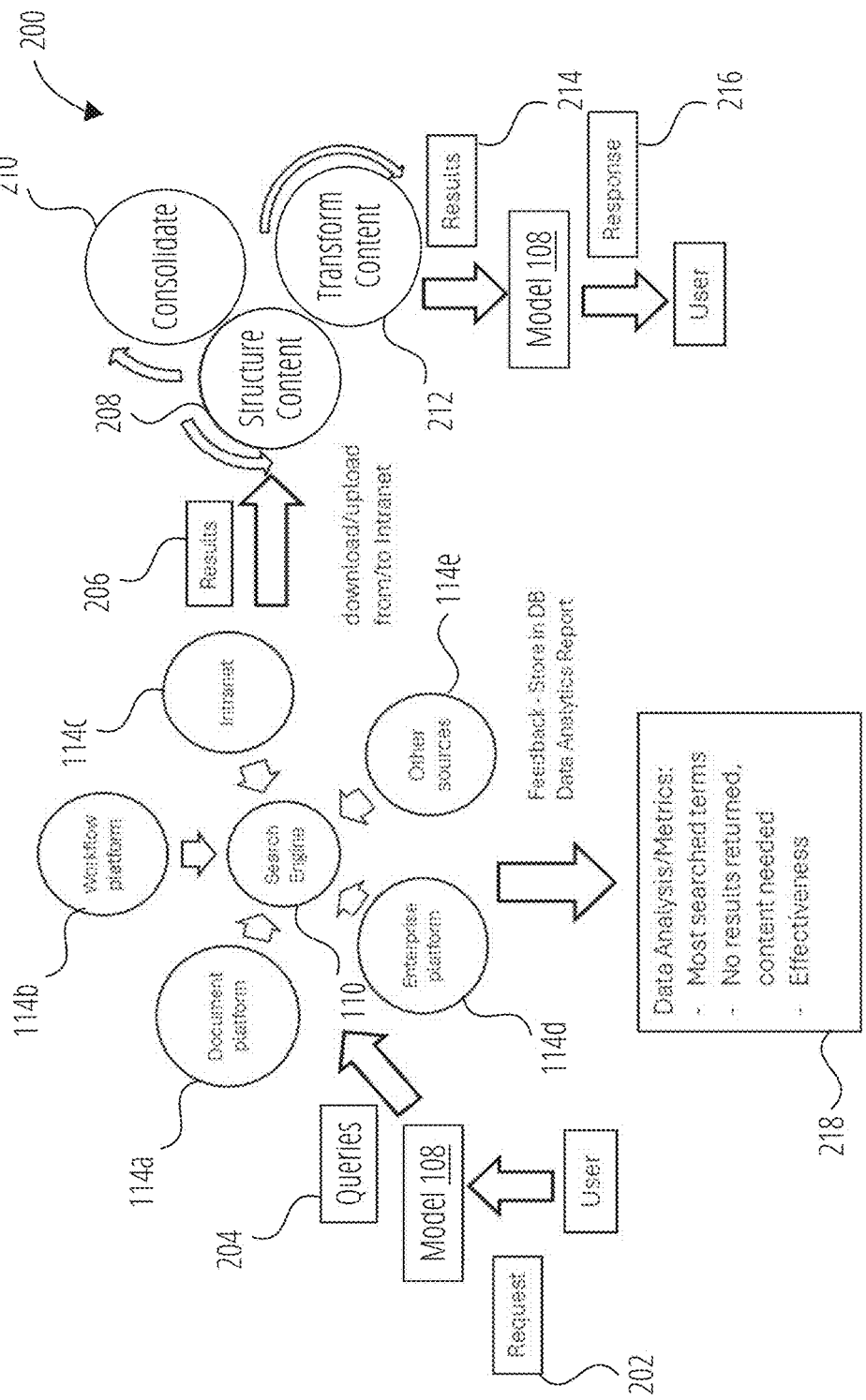

FIG. 2 illustrates an aspect of the subject matter in accordance with one embodiment.

FIG. 3A illustrates an aspect of the subject matter in accordance with one embodiment.

Figure 3B:
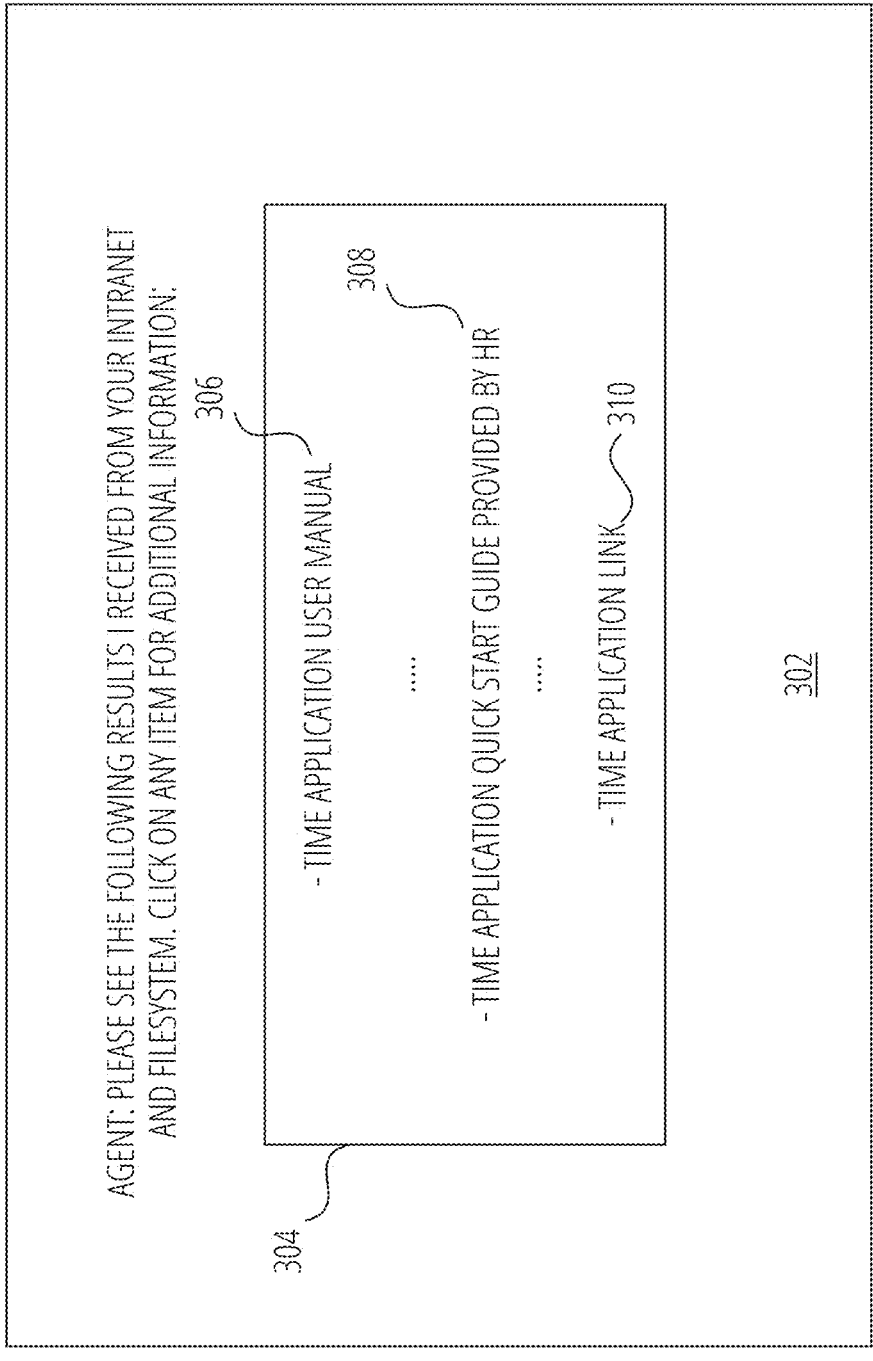

FIG. 3B illustrates an aspect of the subject matter in accordance with one embodiment.

Figure 3C:
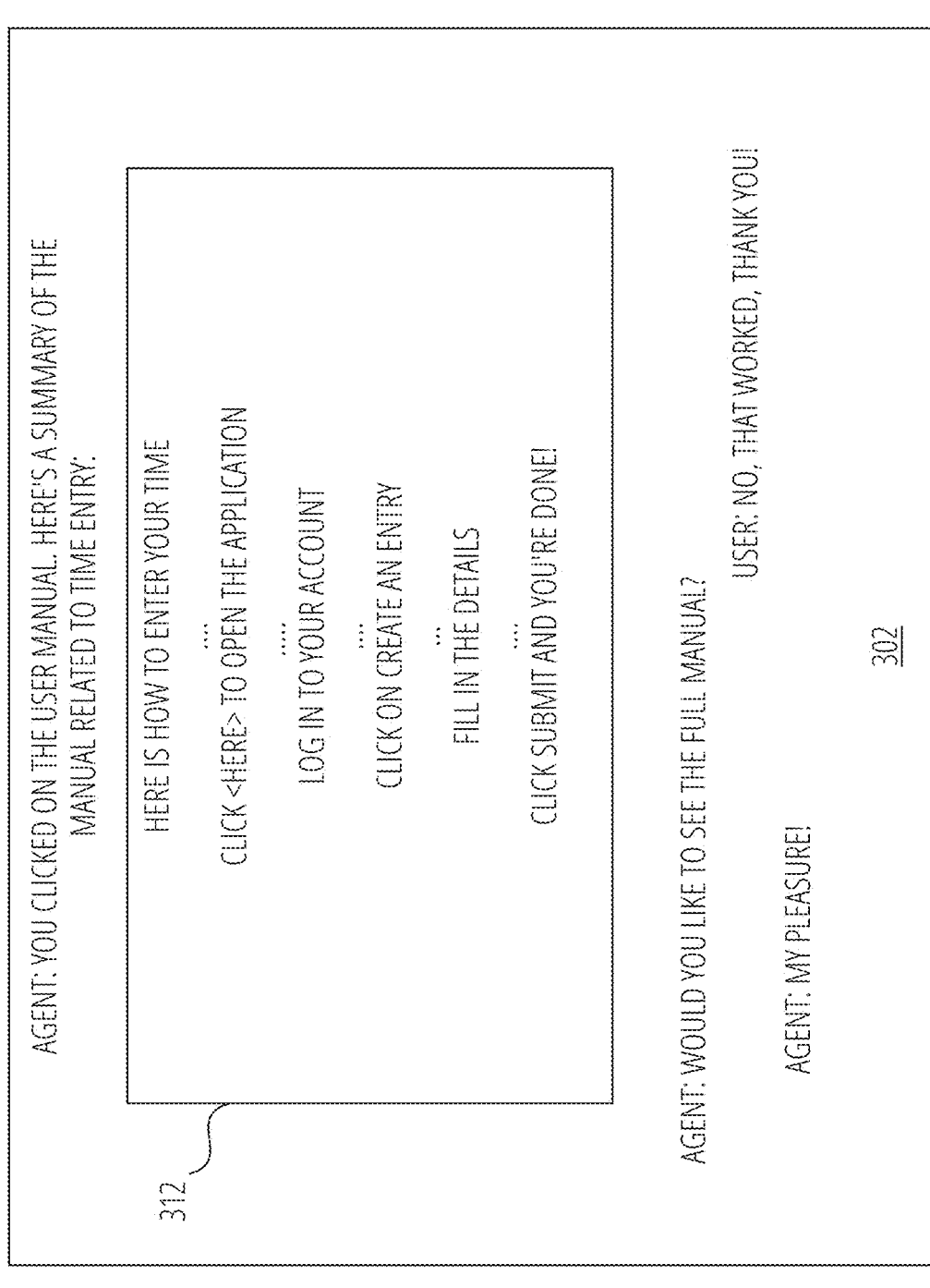

FIG. 3C illustrates an aspect of the subject matter in accordance with one embodiment.

FIG. 4 illustrates a logic flow 400 in accordance with one embodiment.

Figure 5A:
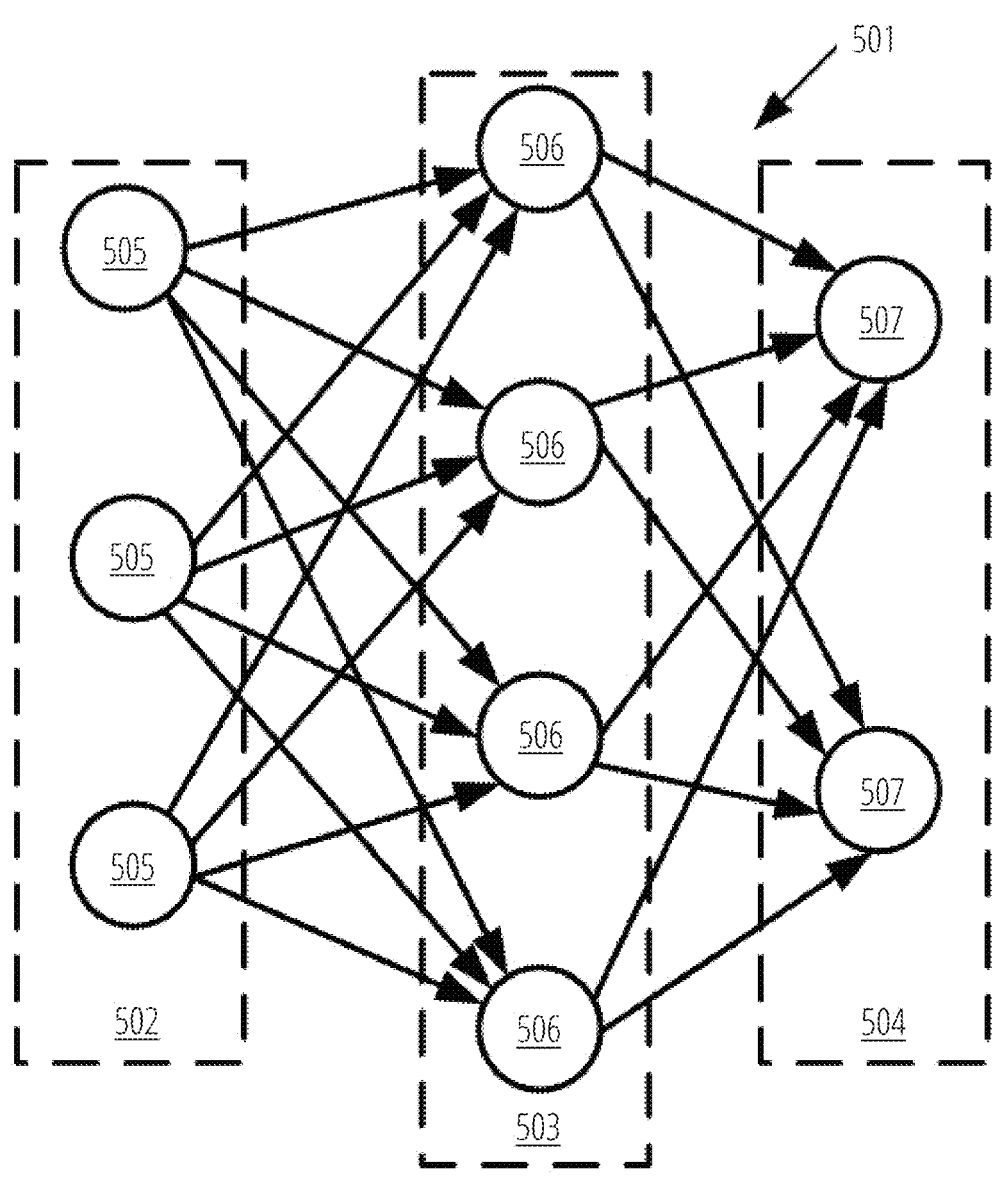

FIG. 5A is a diagram of a feedforward network, according to at least one embodiment, utilized in machine learning.

Figure 5B:
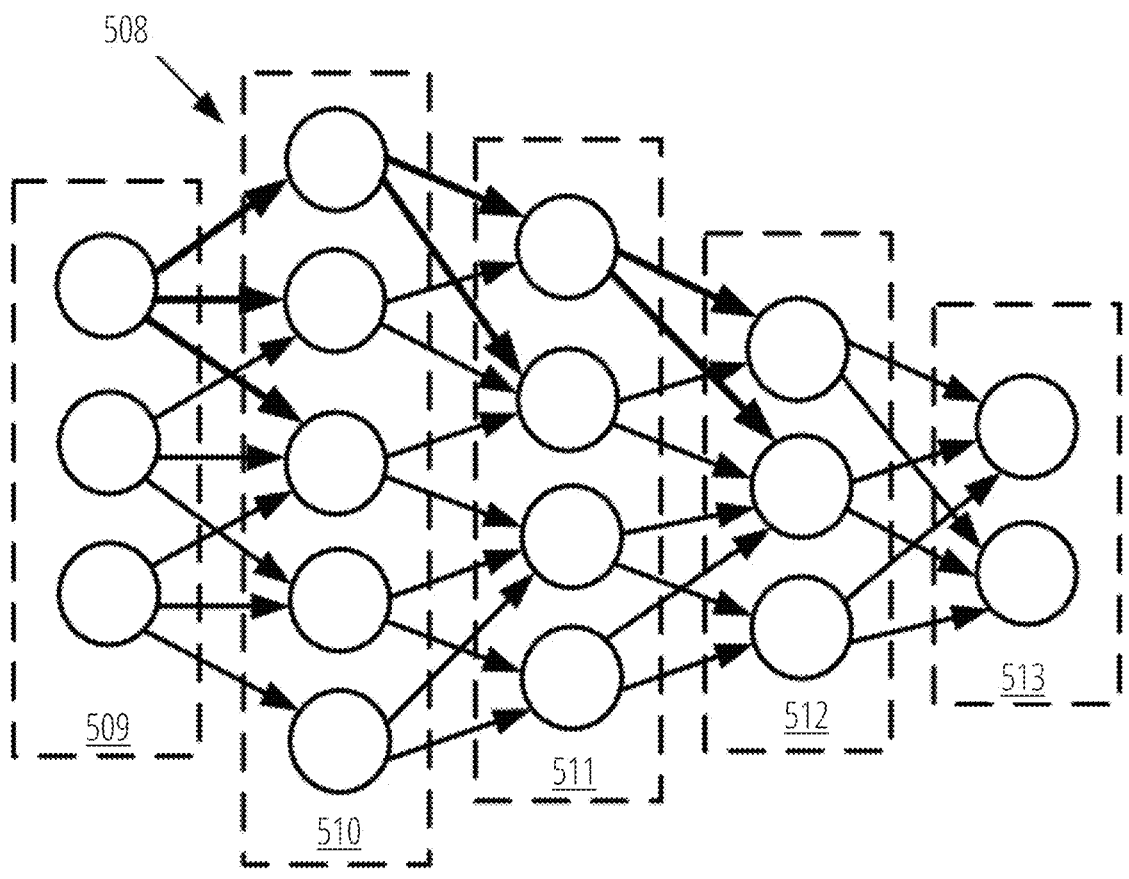

FIG. 5B is a diagram of a convolutional neural network, according to at least one embodiment, utilized in machine learning.

Figure 5C:
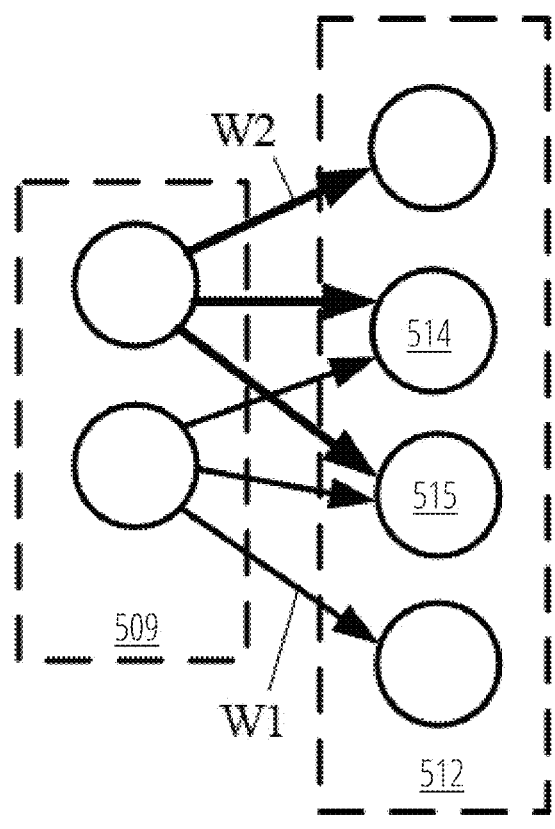

FIG. 5C is a diagram of a portion of the convolutional neural network of FIG. 5B, according to at least one embodiment, illustrating assigned weights at connections or neurons.

Figure 6:
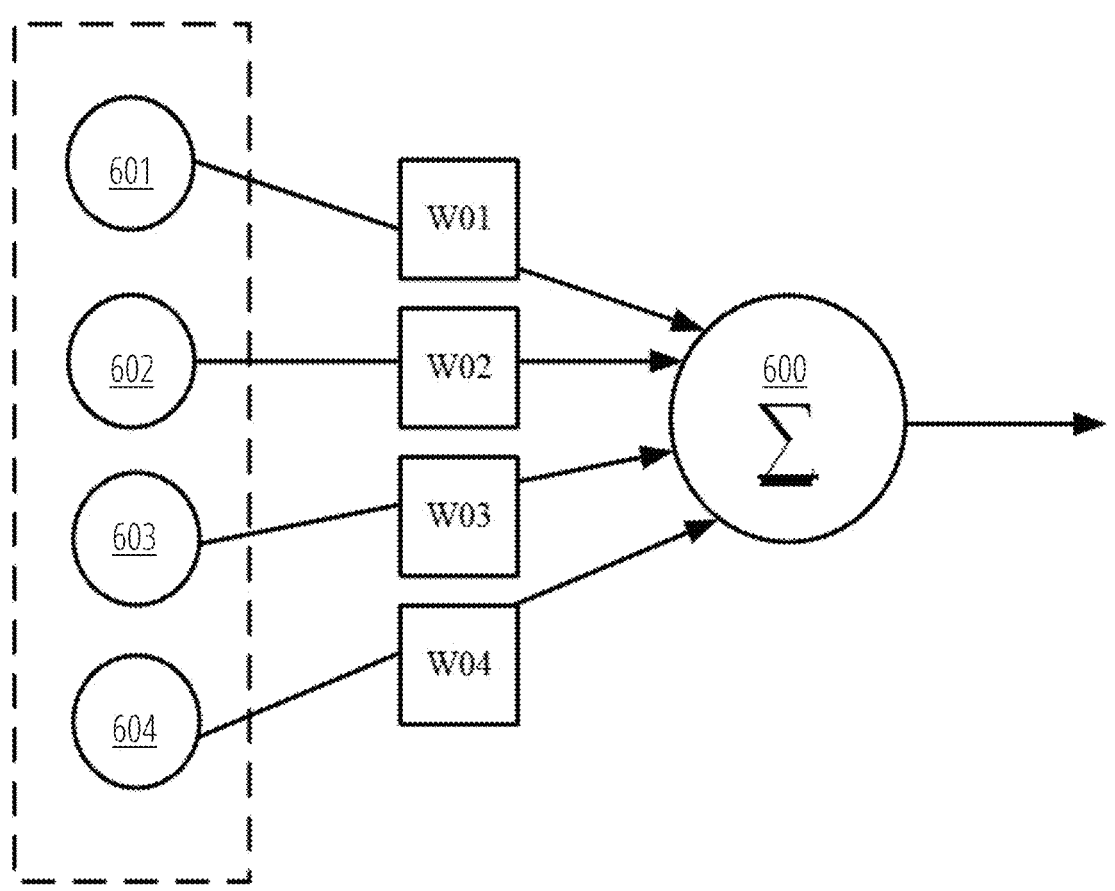

FIG. 6 is a diagram representing an exemplary weighted sum computation in a node in an artificial neural network.

Figure 7:
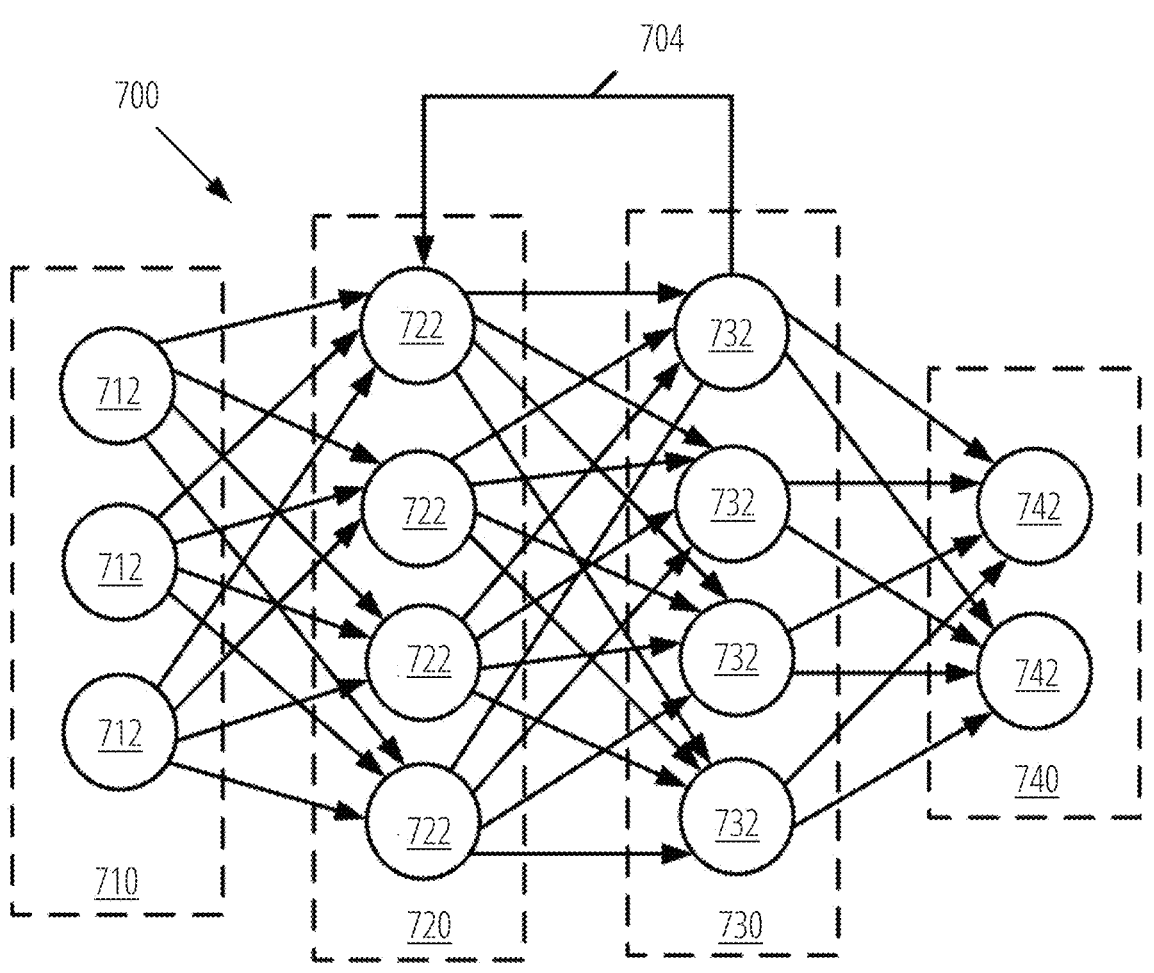

FIG. 7 is a diagram of a Recurrent Neural Network (RNN), according to at least one embodiment, utilized in machine learning.

Figure 8:
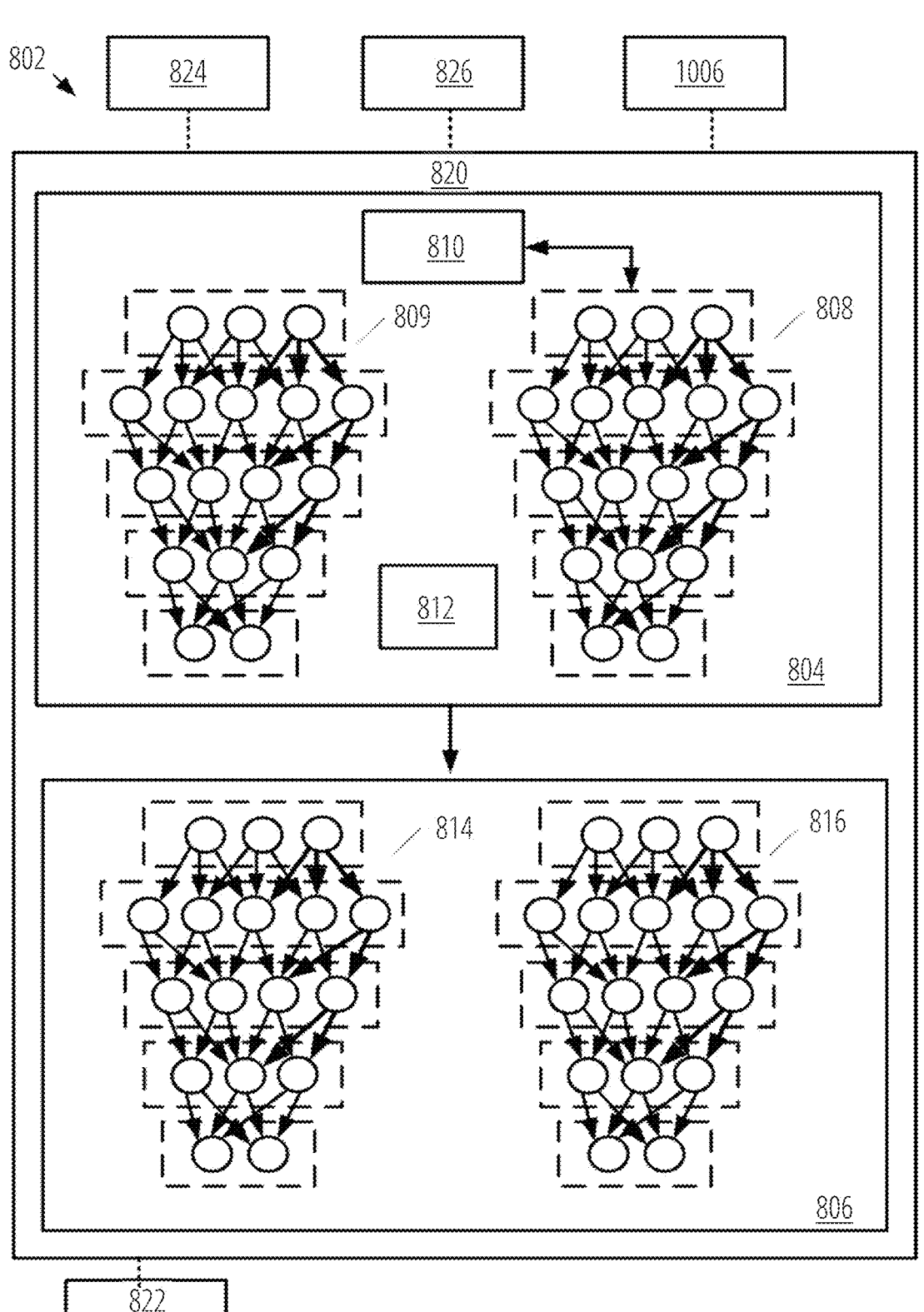

FIG. 8 is a schematic logic diagram of an artificial intelligence program including a front-end and a back-end algorithm.

Figure 9:
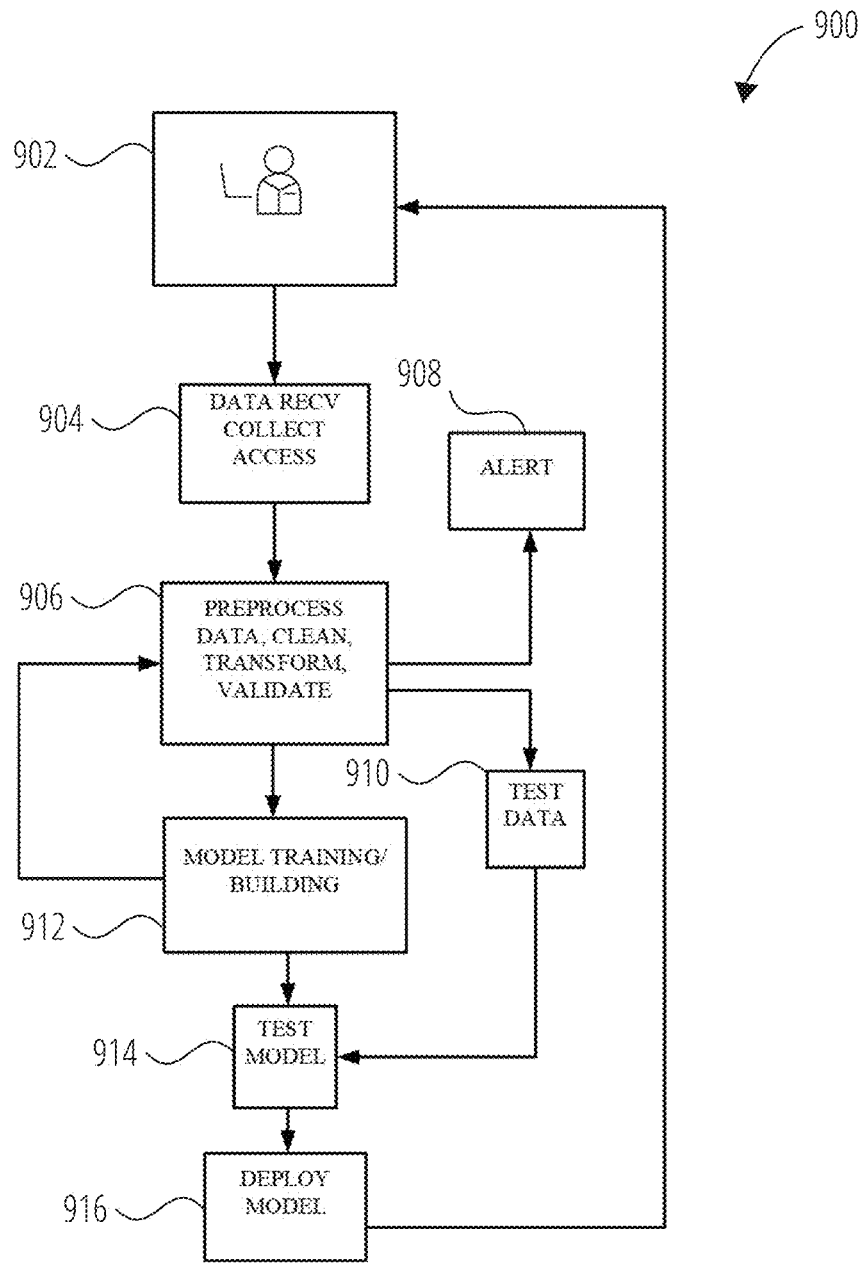

FIG. 9 is a flow chart representing a method, according to at least one embodiment, of model development and deployment by machine learning.

Figure 10:
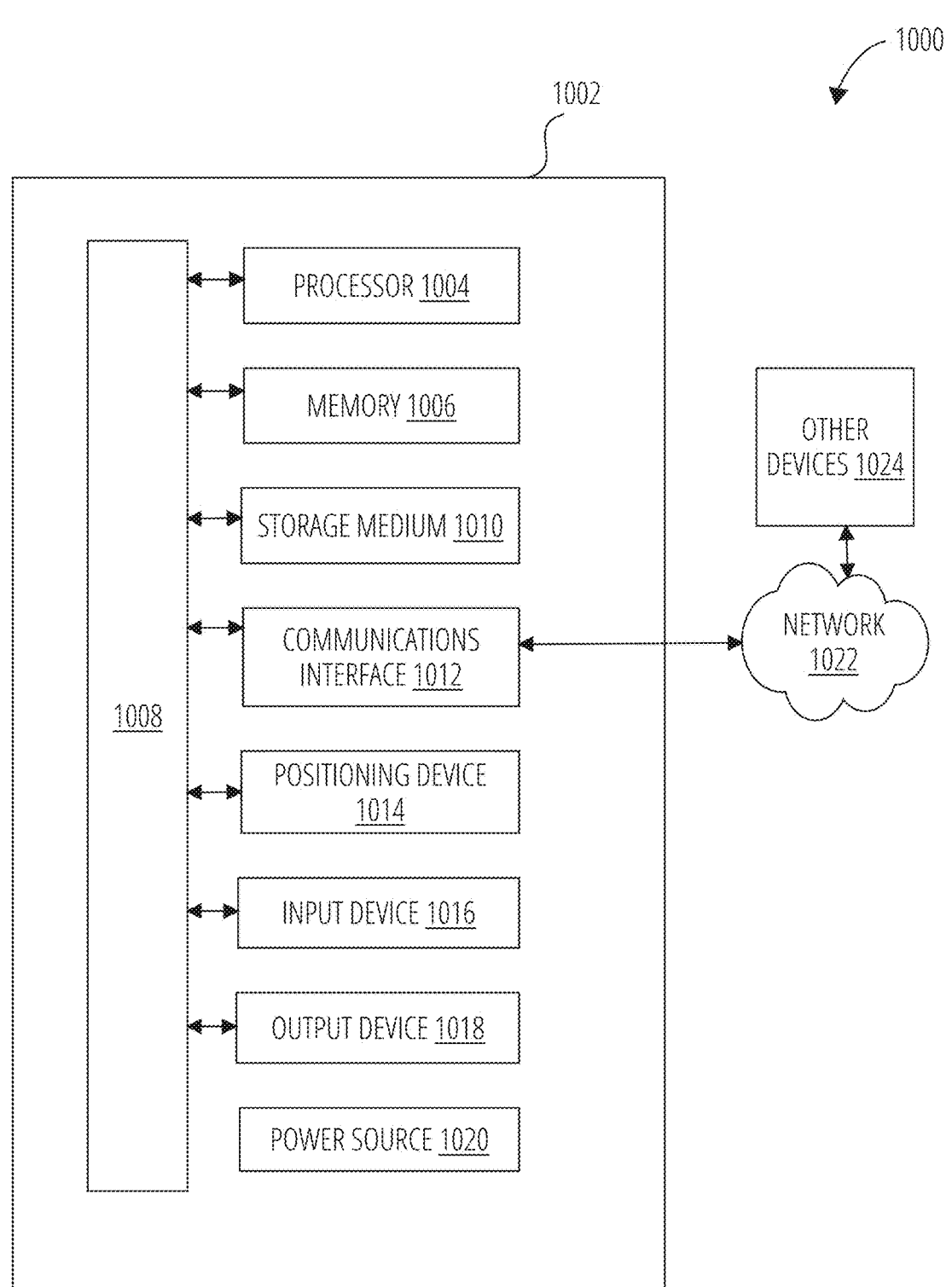

FIG. 10 illustrates a computing system 1000 for natural language search and knowledge management using deep learning, in accordance with one embodiment.

DETAILED DESCRIPTION

Embodiments disclosed herein provide techniques for artificial intelligence (AI) discovery for knowledge management. Generally, an entity may have access to a plurality of data sources in which data can be stored and searched. The data sources may include intranets, file sharing platforms, databases, the Internet, or any type of data source. However, these data sources are often disparate, meaning a single solution cannot be used to search each data source using conventional techniques.

Advantageously, embodiments disclosed herein provide an AI agent that is trained to communicate with users, e.g., as a chatbot, a speech-based interactive voice response (IVR) agent, etc., and search each of the plurality of data sources. More generally, embodiments disclosed herein may leverage specific data source configurations (e.g., connection parameters such as single sign on (SSO), indexing types, etc.) to access and search catalogued data (e.g., data that has been labeled with metadata, tags, etc.) of the plurality of data sources. For example, each data source may have a respective configuration that uses a specific set of APIs for authentication and searches. For example, a first data source may use a first type of SSO and use tags for labeling content. Similarly, a second data source may use a second type of SSO (different than the first type) and use keywords for labeling content. When a user asks a natural language question to the AI agent, the AI agent may generate a query for each data source based on the question. Each query may be specific to the particular data source, e.g., using the connection parameters and labeling type. For example, a first query may use the APIs of the first data source and one or more tags generated based on the question to be searched against the tags of the first data source. Similarly, a second query may use the APIs of the second data source and one or more keywords generated based on the question to be searched against the keywords of the second data source. One or more search results may be received from each data source, and the AI agent may generate a natural language response based on the results.

For example, the AI agent may rank the results (e.g., based on scoring, etc.) and return a subset of the highest ranking results as part of a natural language response to the user. In some embodiments, the AI agent may perform post-processing on the results. For example, the AI agent may consolidate the content of the search results (e.g., generate a summary of the search results), structure the content of the search results, transform the search results (e.g., generate images and/or videos based on text in the search results, etc.), or perform any other postprocessing operation.

In some embodiments, the queries and results may be analyzed to determine metrics such as search term frequencies, search terms for which no results are returned (and therefore associated content is needed), search term effectiveness (e.g., to retrain the agent, etc.).

Providing the AI agent that searches a centralized knowledge platform provides advantages in any number or type of contexts. For example, users may communicate with the AI agent to access information in their organization's knowledge platform. Doing so is advantageous to new users (e.g., new employees), for training users, for change management, for learning application functionality and/or architecture, identifying points of contact within an organization (e.g., which user is manager of a specific application, service, etc.), batch jobs, change management, etc.

Advantageously, embodiments disclosed herein provide a conversational AI-based agent configured to search disparate data sources across a variety of diverse platforms. By training the agent to access and search each data source, embodiments disclosed herein search each data source to supplement responses returned to the user. Doing so improves the performance of conversational AI agents, which required manual configuration and significant levels of integration across multiple diverse systems to access and search the data stored therein. Furthermore, by accessing information and transforming the data for users, embodiments disclosed herein may provide access to the content to the users using less time and resources, thereby improving the performance of these systems. For example, a user who is searching for information within their organization may find the information via the AI agent using fewer searches, thereby reducing the amount of computing resources required to search for and return the information to the user. Embodiments are not limited in these contexts.

Aspects of the present disclosure and certain features, advantages, and details thereof are explained more fully below with reference to the non-limiting examples illustrated in the accompanying drawings. Descriptions of well-known processing techniques, systems, components, etc. are omitted so as to not unnecessarily obscure the disclosure in detail. It should be understood that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments. Like numbers refer to like elements throughout.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the disclosure. Therefore, it is to be understood that, within the scope of the included claims, the disclosure may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present disclosure can include fixed function hardware, while other embodiments can utilize a software-based implementation of the functionality described. Certain embodiments combine both types of program code.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

FIG. 1 illustrates a system 100 for natural language search and knowledge management using deep learning, according to one embodiment. As shown, the system 100 includes one or more servers 102, one or more user devices 104, and a plurality of data sources 114a-114c communicably coupled via one or more networks 106. The servers 102, user devices 104, and data sources 114a-114e are representative of any type of physical and/or virtualized computing system. The user devices 104, and data sources 114a-114e each include at least one processor for executing instructions and at least one memory for storing instructions, each not pictured for the sake of clarity.

As shown, the server 102 includes a discovery application 106a and the user device 104 106s include a corresponding discovery application 106b. The discovery application 106a may be the same as discovery application 106b. For example, the discovery application 106b may be a client-side instance of the application, while the discovery application 106a may be a server-side instance of the application.

The discovery applications 106a-106b include a model 108 (also referred to as an "agent" or "assistant") that communicates with users in natural language. The model 108 may be implemented as a text-based chatbot, a speech-based interactive voice response (IVR) system, or any type of model that communicates with users using natural language. Therefore, the model 108 may be any type of AI model, such as a large language model (LLM), neural network, machine learning model, etc.

Often, when communicating with users, the model 108 may need to access external data sources such as the data sources 114a-114e to provide responses. This may be referred to as retrieval-augmented generation (RAG), which combines information retrieval systems with large language models (LLMs) to improve the quality of responses returned to the user. The model 108 may leverage or otherwise include a search component 110 to facilitate the RAG. However, the data sources 114a-114e may be disparate systems such that the data sources 114a-114c cannot be simply searched using conventional techniques.

For example, the data sources 114a-114e may include intranets, the Internet, file storage platforms such as Share-Point®, workflow platforms such as ServiceNow®, enterprise platforms such as Confluence®, databases, or any other type of data source. Although data sources 114a-114e are shown, any number and type of data sources may be included in the system 100. As shown, the data sources 114a-114e include one or more data stores 116a-116e and one or more interfaces 118a-118e, respectively. The data stores 116a-116e are representative of any number and type of data storage solutions, which may include databases, files, spreadsheets, storage media, and the like. Examples of data stores 116a-116e include, but are not limited to, Confluence pages, ServiceNow objects, SharePoint files, account databases for customer accounts, databases for payment accounts, production databases for applications, financial institution databases, databases for cached data, and databases for files such as those for user accounts, user profiles, account balances, and transaction histories, files downloaded or received from other devices, and other data items and the like. Example accounts with financial institutions include a checking account, a savings account, a money market account, a certificate of deposit, a mortgage or other loan account, a retirement account, a brokerage account, or any other type of account.

In some embodiments, the data in the data stores 116a-116e is pre-processed, e.g., catalogued, documented, tagged with tags, has metadata applied thereto, has descriptions applied thereto, e.g., to make the data accessible to the model 108.

The interfaces 118a-118e are representative of specific configurations required to access the respective data sources 114a-114e and process queries received from the server 102. For example, the interfaces 118a-118e may include APIs, search engines, authentication frameworks (e.g., SSO, login/password, Lightweight Directory Access Protocol (LDAP), Security Assertion Markup Language (SAML), etc.), and configuration for the respective data stores 116a-116c (e.g., the type of data store, indexing types of the data store such as tags, labels, metadata, etc.). Therefore, for example, the interface 118a of data source 114a may require SSO authentication and apply tags to the data in the data store 116a. Similarly, the interface 118b of data source 114b may require a login/password and apply metadata to the data in the data store 116b.

Advantageously, a data source configuration 112 may store configurations for the data sources 114a-114c. For example, the data source configuration 112 may store, for each data source 114a-114c, a respective configuration reflecting the parameters required to access the interfaces 118a-118e. For example, the data source configuration 112 may include authentication types, data source types, indexing types, formats, or any other attribute thereof. Although depicted as being external to the model 108, in some embodiments, the data source configuration 112 is included in the model 108.

In some embodiments, the model 108 is trained based on one or more of the data source configuration 112, the data in the data stores 116a-116e, and/or the interfaces 118a-118c. Doing so allows the model 108 to communicate with users in natural language and generate queries that target each data source 114a-114c. Therefore, once trained, the model 108 may communicate with a user via natural language.

For example, a user of the discovery application 106a or discovery application 106b may communicate with the model 108 using natural language. The user may present an indication of a question, such as "who is the manager of application x?" The model 108 may analyze the question to generate one or more queries in accordance with the data source configuration 112 that are executed by the search component 110 against the data sources 114a-114c. Doing so may return one or more search results from each data source 114a-114c. In some embodiments, the search component 110 and/or the model 108 may rank, score, or otherwise process the results. The scoring may be based on any scoring algorithm that reflects the relevance of each result, e.g., based on the presence of search terms, terms similar to the search terms, etc. The results may include links to various elements of the data sources 114a-114c. Therefore, in some embodiments, the model 108 may receive or otherwise access the data at the links to analyze the content therein.

For example, model 108 may consolidate the content, generate a summary of the content, and/or transform the content. For example, the model 108 may determine that that a first result of the search results returned from the data sources is associated with a profile of user Y and analyze user Y's profile. Doing so allows the model 108 to generate a natural language response indicating that user Y is the manager of application X and include contact information for user Y. Embodiments are not limited in these contexts.

As another example, when text data is returned at each link, the model 108 may generate images that summarize the text and/or generate videos that summarize the text. Embodiments are not limited in these contexts.

Over time, the discovery application 106a and/or model 108 may generate metrics and/or feedback based on the communications with users, the queries submitted to the data sources 114a-114c, and/or the results returned from the data sources 114a-114c. The metrics may include the frequencies of each search term, whether search queries returned no results, and/or the effectiveness of each query. For example, if the search queries generated to identify the manager of application X return no results, the model 108 and/or discovery application 106a may generate and transmit a notification to one or more users indicating the manager of application X cannot be identified and therefore data needs to be added to the data stores 116a-116e to identify the manager of application X. Embodiments are not limited in these contexts.

In some embodiments, the servers 102, data sources 114a-114e, and user devices 104 may store, execute, or otherwise host a plurality of applications (not pictured for clarity). The applications may include any number and type of application. For example, the applications may include video conferencing applications, audio conferencing applications, voice over internet protocol (VOIP) applications, soft phone applications, messaging applications, chatbots, email clients, web browsers, document editors, account management applications, mobile P2P payment system client applications, applications provided by financial institutions, financial applications, payment applications, network functions, Automated Clearing House (ACH) applications, FedNow payment applications, real-time payments (RTP) applications, monetary transfer applications, mobile wallet applications, accounting applications, payment processing frameworks, etc. In some embodiments, the applications may include features to process at least a portion of a transaction. The transactions may include purchases, payments, equity transactions, cryptocurrency sales, or any type of transaction. Furthermore, a given transaction may be processed at least in part by multiple applications. Further still, a given operation (including processing transactions) may include processing performed by multiple components of the system 100.

In one embodiment, when a user decides to enroll in a mobile banking program, the user downloads or otherwise obtains the mobile banking system client application from a mobile banking system, for example enterprise system 100, or from a distinct application server. In other embodiments, the user interacts with a mobile banking system via a web browser application in addition to, or instead of, the mobile P2P payment system client application.

The network 106 may also incorporate various cloud-based deployment models including private cloud (e.g., an organization-based cloud managed by either the organization or third parties and hosted on-premises or off premises), public cloud (e.g., cloud-based infrastructure available to the general public that is owned by an organization that sells cloud services), community cloud (e.g., cloud-based infrastructure shared by several organizations and manages by the organizations or third parties and hosted on-premises or off premises), and/or hybrid cloud (e.g., composed of two or more clouds e.g., private community, and/or public).

The user devices 104 may include automatic teller machines (ATMs) utilized by the system 100 in serving users. In another example, the servers 102 represent payment clearinghouse or payment rail systems for processing payment transactions, and in another example, the servers 102 such as merchant systems or banking systems configured to interact with the user devices 104 during transactions and also configured to interact with the enterprise system 100 in back-end transactions clearing processes.

The user devices 104 may also be configured to obtain and process various forms of authentication via an authentication system to obtain authentication information of a user. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

System 100 as illustrated diagrammatically represents at least one example of a possible implementation, where alternatives, additions, and modifications are possible for performing some or all of the described methods, operations, and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The system 100 can offer any number or type of services and products to one or more users. In some examples, an enterprise system 100 offers products. In some examples, an enterprise system 100 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 100, automated assistance may be provided by the enterprise system 100. For example, automated access to user accounts and replies to inquiries may be provided by enterprise-side automated voice, text, and graphical display communications and interactions. In at least some examples, any number of human agents, can be employed, utilized, authorized, or referred by the enterprise system 100. Such human agents can be, as non-limiting examples, point of sale or point of service (POS) representatives, online customer service assistants available to users, advisors, managers, sales team members, and referral agents ready to route user requests and communications to preferred or particular other agents, human or virtual.

Human agents may utilize agent devices (e.g., user devices 104) to serve users in their interactions to communicate and take action. In such embodiments, the user devices 104 can be, as non-limiting examples, computing devices, kiosks, terminals, smart devices such as phones, and devices and tools at customer service counters and windows at POS locations.

FIG. 2 illustrates a sequence flow 200 for natural language search and knowledge management using deep learning, according to one embodiment. As shown, a user may submit a natural language request to the model 108 at block 202. At block 204, the model 108 may generate a plurality of queries based on the natural language request. For example, the model 108 may use the data source configuration 112 to generate queries that are specific to each data source 114a-114c. As stated, the data sources 114a-114e are disparate data sources.

For example, data source 114a may be a web-based collaboration and document management platform such as SharePoint. As such, the data source 114a allows organizations to store, organize, share, and access information securely, with robust tools for document sharing, workflow automation, intranet building, and integration with other applications. Similarly, data source 114b may be a cloud-based workflow automation and IT service management (ITSM) platform such as ServiceNow. As such, the data source 114b helps organizations streamline and automate business processes across IT, HR, customer service, and other functions, offering tools for incident management, task tracking, and integration with enterprise systems to enhance efficiency and service delivery. Similarly, data source 114d may be a collaborative knowledge management and team productivity platform such as Confluence. As such, the data source 114d enables teams to create, organize, and share documents, meeting notes, project plans, and other content in a centralized workspace, fostering streamlined communication and collaboration. The data source 114c may be an intranet, with its own set of resources such as databases, web pages, etc. The data source 114c is representative of other data sources, such as the Internet.

Therefore, the queries generated at block 204 may be based on the data source configuration 112 for each data source 114a-114c. Doing so allows the search component 110 to connect with the data sources 114a-114c (e.g., using authentication credentials, APIs, etc.) and execute the queries against each data source 114a-114e to receive a plurality of results at block 206. At block 208, the model 108 may receive the results and structure the content, e.g., to convert the content into a predetermined format. At block 210, the model 108 may consolidate or generate a summary of the content, e.g., to generate a text summary of the content at each result. At block 212, the model 108 may transform the content, e.g., generate audio, video, and/or images based on the results. The results of the processing at blocks 208-212 may be stored in a database such as the intranet.

At block 214, the model 108 may generate a response based on the results. For example, the model 108 may generate a natural language response based on the results. At block 216, the natural language response is returned to the requesting user. At block 218, the queries and results may be analyzed, e.g., to generate metrics. The metrics may include the effectiveness of the search result (e.g., did the user ask for further information, or was did the user provide a response indicating the requested information was received), the number of results, update frequency counts for the topic and/or queries, etc. Embodiments are not limited in these contexts.

FIG. 3A illustrates an example graphical user interface 302 of the discovery application 106a, according to one embodiment. Although discussed with reference to the discovery application 106a, the discovery application 106b may provide the same or similar functionality discussed with reference to FIG. 3A-FIG. 3C. Embodiments are not limited in these contexts.

As shown, the graphical user interface 302 displays a conversation between a user and a text-based chatbot instance of the model 108. The conversation generally reflects that the user is a new employee in an organization and needs assistance using an application to enter time. As shown, the model 108 identifies a specific application the user is having troubles with, and initiates a search of the data sources 114a-114e, e.g., by generating a plurality of queries based on the user's input and the data source configuration 112 as described in greater detail herein.

FIG. 3B is a continuation of the conversation between the user and the model 108 from FIG. 3A. As shown, the graphical user interface 302 is updated to include a results section 304 that includes one or more search results returned from the data sources 114a-114c. As shown, the model 108 includes one or more links to a subset of the search results. The user may view the corresponding result by selecting each link. In the example depicted in FIG. 3B, the links include a links 306, 308, and 324.

FIG. 3C illustrates a portion of summary 312 generated by the model 108 based on the user selecting the link 306 for the user manual for the time application. As shown, the summary 312 includes a summary of the contents of the user manual for the time application generated by the model 108. As shown, the summary 312 assisted the user such that the user did not need to view the entire manual and/or search for the manual by themselves. As such, the metrics may be updated to reflect the question presented by the user, the queries generated by the model 108 in response, and that the queries were effective. Embodiments are not limited in these contexts.

FIG. 4 illustrates an example logic flow 400 for natural language search and knowledge management using deep learning, according to one embodiment. Although the example logic flow 400 depicts a particular sequence of operations, the sequence may be altered without departing from the scope of the present disclosure. For example, some of the operations depicted may be performed in parallel or in a different sequence that does not materially affect the function of the logic flow 400. In other examples, different components of an example device or system that implements the logic flow 400 may perform functions at substantially the same time or in a specific sequence.

According to some examples, the logic flow 400 includes receiving, by an application executing on a processor, a natural language request at block 402. For example, the discovery application 106a illustrated in FIG. 1 may receive a natural language request. For example, the user may specify "I think the network is down."

According to some examples, the logic flow 400 includes determining, by a large language model (LLM) executing on the processor for each of a plurality of data sources, a respective data source configuration at block 404. For example, the model 108 illustrated in FIG. 1 may determine, for each of the data sources 114a-114e, a respective data source configuration in the data source configuration 112. As stated, the data source configuration 112 may include information needed to authenticate with each of the data sources 114a-114e and how to search (e.g., how the information stored therein is indexed).

According to some examples, the logic flow 400 includes generating, by the LLM for each data source, a respective query based on the natural language request and the data source configuration at block 406. For example, the model 108 illustrated in FIG. 1 may generate, for each of the data sources 114a-114e, a respective query based on the natural language request received at block 402 and the data source configuration 112. As stated, the queries may be based on the indexing type for the data source, e.g., specify tags, metadata, labels, etc., and associated query language to execute the queries.

According to some examples, the logic flow 400 includes processing, by the application based on the configuration, the queries against the plurality of data sources at block 408. For example, the search component 110 illustrated in FIG. 1 may process, based on the data source configuration 112, the queries against the plurality of data sources 114a-114c. For example, the queries may include queries to identify network administrators, reference manuals, etc. The search component 110 may then establish a connection, based on the relevant connection interface 118a-118e, with each of the plurality of data sources and execute the queries. For example, the connection interfaces may include authentication credentials/frameworks, API calls, etc.

According to some examples, the logic flow 400 includes receiving, by the LLM based on the processing, a plurality of results from the plurality of data sources at block 410. For example, the model 108 illustrated in FIG. 1 may receive, from the data sources 114a-114e based on the data sources processing the queries, a plurality of results from the plurality of data sources. As stated, in some embodiments, the LLM may post-process the search results.

According to some examples, the logic flow 400 includes generating, by the LLM, a natural language response to the natural language request, the natural language response comprising an indication of a first result of the plurality of results at block 412. For example, the model 108 illustrated in FIG. 1 may generate a natural language response to the natural language request, the natural language response comprising an indication of a first result of the plurality of results. For example, the first result may be associated with the network administrator's user profile, and the natural language response may include contact information extracted and summarized from the profile by the model 108.

According to some examples, the logic flow 400 includes outputting, by the application, the natural language response for display at block 414. For example, the discovery application 106a illustrated in FIG. 1 may output the natural language response for display.

As used herein, an artificial intelligence system, artificial intelligence algorithm, artificial intelligence module, program, and the like, generally refer to computer implemented programs that are suitable to simulate intelligent behavior (e.g., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG, or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DB-SCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 501 referenced in FIG. 5A) may include a topography with a hidden layer 503 between an input layer 502 and an output layer 504. The model 108 may include one or more of the feedforward networks 501. The input layer 502, having nodes commonly referenced in FIG. 5A as input nodes 505 for convenience, communicates input data, variables, matrices, or the like to the hidden layer 503, having nodes 506. The hidden layer 503 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 505 of the input layer, which then communicates the data to the hidden layer 503. The hidden layer 503 may be configured to determine the state of the nodes in the respective layers and assign weight coefficients or parameters of the nodes based on the edges separating each of the layers, e.g., an activation function implemented between the input data communicated from the input layer 502 and the output data communicated to the nodes 507 of the output layer 504. It should be appreciated that the form of the output from the neural network may generally depend on the type of model represented by the algorithm. Although the feedforward network 501 of FIG. 5A expressly includes a single hidden layer 503, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 508 in FIG. 5B. The model 108 may include one or more of the CNNs 508. As in the feedforward network 501 of FIG. 5A, the illustrated example of FIG. 5B has an input layer 509 and an output layer 513. However where a single hidden layer 503 is represented in FIG. 5A, multiple consecutive hidden layers 510, 511, and 512 are represented in FIG. 5B. The edge neurons represented by white-filled arrows highlight that hidden layer nodes can be connected locally, such that not all nodes of succeeding layers are connected by neurons.

FIG. 5C, representing a portion of the convolutional neural network 508 of FIG. 5B, specifically portions of the input layer 509 and the first hidden layer 510, illustrates that connections can be weighted. In the illustrated example, labels W1 and W2 refer to respective assigned weights for the referenced connections. Two hidden nodes 514 and 515 share the same set of weights W1 and W2 when connecting to two local patches.

Weight defines the impact a node in any given layer has on computations by a connected node in the next layer. FIG. 6 represents a particular node 600 in a hidden layer. The node 600 is connected to several nodes in the previous layer representing inputs to the node 600. The input nodes 601, 602, 603 and 604 are each assigned a respective weight W01, W02, W03, and W04 in the computation at the node 600, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current computation of the parameter, e.g., at least a portion of the output data from the RNN may be used as feedback/input in computing subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network (RNN) is referenced as 700 in FIG. 7. The model 108 may include one or more of the RNNs 700. As in the feedforward network 501 of FIG. 5A, the illustrated example of FIG. 7 has an input layer 710 (with nodes 712) and an output layer 740 (with nodes 742). However, where a single hidden layer 503 is represented in FIG. 5A, multiple consecutive hidden layers 720 and 730 are represented in FIG. 7 (with nodes 722 and nodes 732, respectively). As shown, the RNN 700 includes a feedback connector 704 configured to communicate parameter data from at least one node 732 from the second hidden layer 730 to at least one node 722 of the first hidden layer 720. It should be appreciated that two or more and up to all of the nodes of a subsequent layer may provide or communicate a parameter or other data to a previous layer of the RNN 700. Moreover and in some embodiments, the RNN 700 may include multiple feedback connectors 704 (e.g., connectors 704 suitable to communicatively couple pairs of nodes and/or feedback connectors 704 configured to provide communication between three or more nodes). Additionally or alternatively, the feedback connector 704 may communicatively couple two or more nodes having at least one hidden layer between them, e.g., nodes of nonsequential layers of the RNN 700.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 8 and some embodiments, an artificial intelligence (AI) program 802 may include a front-end algorithm 804 and a back-end algorithm 806. The model 108 may include one or more of the artificial intelligence programs 802. The artificial intelligence program 802 may be implemented on an AI processor 820, such as the processor 1004 of computer 1002 of FIG. 10, and/or a dedicated processing device (e.g., servers 102 and/or user devices 104). The instructions associated with the front-end algorithm 804 and the back-end algorithm 806 may be stored in an associated memory device and/or storage device of the system (e.g., memory 824 and/or storage 826 in FIG. 8), etc.) communicatively coupled to the AI processor 820, as shown. Additionally or alternatively, one or more memory devices and/or storage devices (e.g., storage medium 1010 and/or memory 1006 of FIG. 10, etc.) may be used for processing use and/or including one or more instructions necessary for operation of the AI program 802. In some embodiments, the AI program 802 may include a deep neural network (e.g., a front-end algorithm 804 configured to perform pre-processing, such as feature recognition, and a back-end algorithm 806 configured to perform an operation on the data set communicated directly or indirectly to the back-end algorithm 806). For instance, the front-end algorithm 804 can include at least one CNN 808 communicatively coupled to send output data to the back-end algorithm 806.

Additionally or alternatively, the front-end algorithm 804 can include one or more AI algorithms 810, 812 (e.g., statistical models or machine learning programs such as decision tree learning, associate rule learning, recurrent artificial neural networks, support vector machines, and the like). In various embodiments, the front-end algorithm 804 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 808 and/or AI algorithm 810 may be used for image recognition, input categorization, and/or support vector training. In some embodiments and within the front-end algorithm 804, an output from an AI algorithm 810 may be communicated to a CNN 808 or 809, which processes the data before communicating an output from the CNN 808, 809 and/or the front-end algorithm 804 to the back-end algorithm 806. In various embodiments, the back-end algorithm 806 may be configured to implement input and/or model classification, speech recognition, translation, and the like. For instance, the back-end algorithm 806 may include one or more CNNs (e.g., CNN 814) or dense networks (e.g., dense networks 816), as described herein.

For instance, and in some embodiments of the AI program 802, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end algorithm 804). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 802 may be trained using a semi-supervised learning process in which some but not all of the output data is known, e.g., a mix of labeled and unlabeled data having the same distribution.

In some embodiments, the AI program 802 may be accelerated via a machine learning framework 822 (e.g., hardware). The machine learning framework may include an index of operations, subroutines, and the like (primitives) typically implemented by AI and/or machine learning algorithms. Thus, the AI program 802 may be configured to utilize the primitives of the framework 822 to perform some or all of the computations required by the AI program 802. Primitives suitable for inclusion in the machine learning framework 822 include operations associated with training a convolutional neural network (e.g., pools), tensor convolutions, activation functions, algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 9 is a flow chart representing a logic flow 900, according to at least one embodiment, of model development and deployment by machine learning. The logic flow 900 represents at least one example of a machine learning workflow in which operations are implemented in a machine-learning project.

In block 902, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, block 902 can represent a starting point. However, with regard to continuing or improving an ongoing machine learning workflow, block

902 can represent an opportunity for further user input or oversight via a feedback loop. Such feedback may flow through a user, or in various embodiments, the method automatically provides feedback, retrains and redeploys the retrained model.

In block 904, data is received, collected, accessed, or otherwise acquired and entered as can be termed data ingestion. In block 906, the data ingested in block 904 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing block 906 is updated with newly ingested data, an updated model will be generated. Block 906 can include data validation, which focuses on confirming that the statistics of the ingested data are as expected, such as that data values are within expected numerical ranges, that data sets are within any expected or required categories, and that data comply with any needed distributions such as within those categories. Block 906 can proceed to block 908 to automatically alert the initiating user, other human or virtual agents, and/or other systems, if any anomalies are detected in the data, thereby pausing or terminating the process flow until corrective action is taken.

In block 910, training test data such as a target variable value is inserted into an iterative training and testing loop. In block 912, model training, a core step of the machine learning workflow, is implemented. A model architecture is trained in the iterative training and testing loop. For example, features in the training test data are used to train the model based on weights and iterative computations in which the target variable may be incorrectly predicted in an early iteration as determined by comparison in block 914, where the model is tested. Subsequent iterations of the model training, in block 912, may be conducted with updated weights in the computations.

During each iteration of the training and testing loop, the accuracy of the model may be evaluated. In one embodiment, the re-evaluation of the model can include comparing an output of the model with an actual target result or variable to determine the accuracy of the prediction. If the model is not satisfying a minimum threshold level of accuracy (e.g., the model is underfitted), the system may automatically determine that the threshold level of accuracy is not satisfied and may adjust the weights for a subsequent iteration of the training and testing loop. The weights may be iteratively adjusted during each iteration of the training and testing loop based on the comparison to the threshold level of accuracy. However, there is a balance for training the model to avoid overfitting when the model would not perform well on predictions of new data. Rather, the model is automatically trained to be well-fitted such that it satisfies a threshold level of accuracy without learning the noise in the data to the extent that the model would not apply to new data by preventing additional iterations of the training and testing once a maximum accuracy threshold value has been obtained. Thus, with each iteration of the training and testing loop, the accuracy of the model is improved and the iterative training and testing of the model provides an improvement to the performance of a computer and computing technology because the system may automatically determine how many iterations to perform so that the model is well-fitted by surpassing the minimum threshold level of accuracy while automatically stopping the iterative training and testing of the model before the maximum accuracy threshold is obtained. In some embodiments, the training and testing loop utilizes a backpropagation algorithm and a gradient descent algorithm. Gradient descent is an optimization algorithm used to minimize differentiable real-valued multivariate functions. Gradient descent is an optimization algorithm used to minimize differentiable real-valued multivariate functions. The gradient descent algorithm may be used to iteratively adjust model parameters using computed derivatives to minimize a loss function. Backpropagation may be used to compute the gradient of the error function with respect to the neural network's weights.

When compliance and/or success in the model testing in block 914 is achieved, process flow proceeds to block 916, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

As discussed above, oversight of a deployed machine learning model may be automatically performed via a feedback loop whereby the method assesses performance of the deployed model (see block 916) and the feedback loop automatically provides feedback for further training of the machine learning model to improve its performance, and upon completion of the other method blocks such as block 912, the machine learning model that has been automatically retrained based on the feedback loop is then redeployed (block 914). In some embodiments, the system is continually receiving training data as new predictions are made and more data is collected. The continuous training data may be discretized to generate input data to retrain the model. Discretization methods can convert continuous data to discrete data by binning, clustering, and numerical discretization. The model may monitor incoming data sets to make predictions. When predictions are made the system analyzes the predictions to determine whether the model needs to be retrained.

The systems and methods disclosed herein may also be used to analyze text to form the predictions. In particular, the systems and methods described herein include a combination of elements that are utilized in a specific manner for automatically performing automated processes based on technological efficiency, which provides a specific improvement over prior art systems resulting in improved computer processing for faster automated processing functions. For example, the systems and method may apply robotic process automation for digital transformation of the data based on specific criteria to interpret text and unstructured data using text processing software techniques. The interpretation of the text may be implemented using the models described herein including unsupervised learning techniques or supervised learning techniques. The processor may track how much memory and/or processing time has been allocated to perform a function and the system may be trained to automatically detect and identify processes eligible for increased efficiencies based on existing inefficiencies in the process.

For example, the machine learning models may use unsupervised learning to identify and characterize hidden structures of unstructured and unlabeled content data, or supervised techniques that operate on labeled content data and include instructions informing the system which outputs are related to specific input values. In such instances, software processing can rely on iterative training techniques and training data to configure neural networks with an understanding of individual words, phrases, subjects, sentiments, and parts of speech.

Supervised learning software systems are trained using content data that is labeled or "tagged." During training, the supervised software systems learn the best mapping function between a known data input and expected known output (e.g., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a computed probability and a desired threshold probability.

The software systems are supervised because the way of learning from training data mimics the same process of a teacher supervising the end-to-end learning process. Supervised learning software systems are typically capable of achieving excellent levels of performance, but this excellent level of performance requires labeled data to be available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together, which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

Clustering software techniques can automatically group semantically similar words together to accelerate the derivation and verification of an underneath common intent—e.g., ascertain or derive a new classification or subject, and not just classification into an existing subject or classification. Unsupervised learning software systems are also used for association rules mining to discover relationships between features from content data.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together, which then give insights into the subjects of those words and documents. The content driver software service can utilize software processing techniques that include Non-Matrix Factorization, Correlated Topic Model ("CTM"), and K-Means or other types of clustering.

Neural networks may be trained using training set content data that comprise sample tokens, phrases, sentences, paragraphs, or documents for which desired subjects, content sources, interrogatories, or sentiment values are known. A labeling analysis may be performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data may then be fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the computed probability and the known certainty. Then parameters to the neural network are adjusted (e.g., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorizing content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context communication elements (e.g., such as words, speech patterns, tone, timbre, cadence, etc.) may, in part, determine how often communication elements appear together. Determining the adjacent pairing of communication elements can be achieved by creating a co-occurrence matrix with the value of each member of the matrix counting how frequently one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (e.g., words) in a corpus of content data and turning it into a co-occurrence matrix, another software processing technique may be used where a communication element in the content data corpus predicts the next communication element. Looking through a corpus, counts may be generated for adjacent communication elements, and the counts are converted from frequencies into probabilities (e.g., using n-gram predictions with Kneser-Ney smoothing) using a simple neural network. Suitable neural network architectures for such purpose include a skip-gram architecture. The neural network may be trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a uniform manifold approximation and projection algorithm ("UMAP") can be applied to reduce dimensionality while maintaining essential information.

Prior to conducting a subject analysis to ascertain subject identifiers in the content data (e.g., topics or subjects addressed in the content data) or interaction driver identifiers in the content data (e.g., reasons why the customer initiated the interaction with the provider, such as the reason underlying a support request), the system can perform a concentration analysis on the content data. The concentration analysis concentrates, or increases the density of, the content data by identifying and retaining communication elements that have significant weight in the subject analysis and discarding or ignoring communication elements that have relativity little weight.

In one embodiment, the concentration analysis includes executing a term frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (e.g., topics) addressed within the content data. The subject classification analysis can specifically identify one or more interaction driver identifiers that are the reason why a user initiated a shared experience or support service request. An interaction driver identifier can be determined by, for example, first determining the subject identifiers having the highest weight quantifiers (e.g., frequencies or probabilities) and comparing such subject identifiers against a database of known interaction driver identifiers.

In one embodiment, the subject classification analysis is performed on the content data using a Latent Dirichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (e.g., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recomputed, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (e.g., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets were analyzed to determine if the reasons driving a customer support request were identified by the descriptor set subject identifiers.

The software model may be evaluated according to three categories, including a "good match" where the support request reason(s) are identified by the top words in the subject vector (e.g., the words with the highest weight or frequency), a "moderate" match where the support request reason(s) are identified by the second tier of words in the subject vector (e.g., words six to ten), and a "poor" match where, for instance, the top words in a subject vector do not match or identify the reasons the support request was initiated.

Alternatively, instead of selecting a pre-determined number of communication elements, post-clustering concentration analysis can analyze the subject vectors to identify communication elements that are included in several subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is thus turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two-unit vectors. All the dot products for all vectors in a given subject are added together to provide a weighting quantifier or score for the given subject identifier, which is taken as subject weighting data. A similar analysis can be performed on vectors created through other processing, such as K-means clustering or techniques that generate vectors where each word in the vector is replaced with a probability that the word represents a subject identifier or request driver data.

To illustrate generating subject weighting data, for any given subject there may be numerous subject vectors. Assume that for most of subject vectors, the dot product will be close to zero-even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analysis.

In another example, a number of subject identifiers may be substantially different, with some subjects having orders of magnitude fewer subject vectors than do other subjects. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are computed for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency-inverse document frequency software processing techniques to vectorize the content data and generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight by the content driver software service.

The content data can be visualized and subject to a reduction into two-dimensional data using a UMAP to generate a cluster graph visualizing a plurality of clusters. The content driver software service feeds the two-dimensional data into a DBSCAN and identify a center of each cluster of the plurality of clusters. The process may, using the two dimensional data from the UMAP and the center of each cluster from the DBSCAN, apply a KNN to identify data points closest to the center of each cluster and shade each of the data points to graphically identify each cluster of the plurality of clusters. The processor may illustrate a graph on the display representative of the data points that are shaded following application of the KNN.

The content driver software service can also incorporate Part of Speech ("POS") tagging software code that assigns words a part of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (e.g., a content source).

In instances where audio signals are being interpretated from audio files, video files, continual audio inputs (e.g., via a microphone), the system may apply binary time-frequency masks to separate signals from multiple sources by using a binary matrix to indicate which portions of a representation should be turned on or off. A binary mask includes a matrix of binary values that correspond to sources such that it is multiplied with a spectrogram to include or exclude portions of the audio. The binary time-frequency mask for each speaker or audio source is obtained using clustering that assigns the number "1" to all time-frequency bins corresponding to the respective speaker and assigning the number "0" to the remaining time-frequency bins. Inverse short time Fourier transform (STFT) may convert the obtained separated signals into a time domain for multiple downstream applications. Speech waveforms may be synthesized from the masked clusters where each waveform corresponds to a different source of the audio. Further, the speech waveforms may be combined to generate a mixed speech signal by stitching together the speech waveforms corresponding to the different sources. Advantageously, this process can be used to remove certain voices or background conversations from a recording where there are multiple sources of audio. Synthesizing speech waveforms from a cluster of numbers is not a process that can be practically performed in the human mind. By combining speech waveforms to generate a mixed speech signal by stitching together speech waveforms corresponding to different sources and excluding the sources that are undesired as either being undesired voices or background conversations. Advantageously, this can be used to isolate a desired source of audio as part of computer-based separation techniques to distinguish audio from different users. This can help the system accurately interpret the most relevant information to perform further analysis on the speech of the desired source of the audio.

The systems and methods disclosed herein may utilize deployed models such as model 108 (e.g., machine learning models, neural networks, predictive models, etc.) to make predictions about the search results that would assist a user presenting a natural language request. The use of specially trained models realizes a number of improvements over traditional methods of search, including more accurate natural language responses based on data stored in and accessed from the data sources 114a-114c. Further, the systems and methods disclosed herein lead to faster training times and a more accurate model.

The systems and methods disclosed herein reflect an improvement in the functioning of a computer or an improvement to other technology or a technical field by leveraging a model 108 that is configured to generate queries for any number and type of data sources such that the data sources can be accessed to provide information that the model 108 to generate natural language responses.

In addition, the systems and methods utilize a particular machine or manufacture such as, for example, servers 102 and/or data sources 114a-114c. The servers 102 and/or data sources 114a-114e are integral to effectuating the improvements disclosed herein by using different data source configuration 112 that allows the model 108 to access information stored in the data sources 114a-114c. Further, the systems and methods disclosed herein utilize a combination of software and hardware that include, for example, a physical circuit, which is a machine or manufacture.

FIG. 10 illustrates an example computing system 1000 suitable for implementing various embodiments as described herein. As shown, the computing system 1000 comprises a computer 1002, which is representative of any type of physical and/or virtualized computing device. Examples of the computer 1002 include, but are not limited to, a server, workstation, laptop, mobile device, smartphone, tablet computer, mainframe, distributed computing system, compute cluster, media device, camera, gaming device, a portable digital assistant (PDA), a system-on-chip (SoC), a pager, a television, a wearable device, a virtual machine (VM), container, or any other device with processing capabilities. In one embodiment, the computer 1002 is representative of some or all of the components of the servers 102, user devices 104, and data sources 114a-114c. More generally, the computing system 1000 is configured to implement all systems, methods, apparatuses, media, and embodiments disclosed herein.

As shown, the computer 1002 includes one or more processors 1004, one or more memories 1006, one or more non-transitory storage media 1010, one or more communications interfaces 1012, one or more positioning devices 1014, one or more input devices 1016, and one or more output devices 1018 communicably coupled via an interconnect 1008. A power source 1020, such as a power supply, battery, or any type of power source may provide power to the computer 1002.

The processor 1004 is representative of any type of processing circuit. For example, the processor 1004 may be a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, a digital signal processor, analog to digital converter, digital to analog converter, and the like.

The memory 1006 is representative of any computer readable medium to store data, code, or other information. The memory 1006 may include volatile memory, such as volatile Random Access Memory (RAM) including a cache area for the temporary storage of data. The memory 1006 may also include non-volatile memory, which can be embedded and/or may be removable. The non-volatile memory can additionally or alternatively include an electrically erasable programmable read-only memory (EEPROM), flash memory or the like. The storage medium 1010 is representative of any type of computer readable medium to store data, code, or other information. Examples of storage media 1010 include solid state drives, hard drives, Redundant Array of Independent Disks (RAID) drives, memory pools, USB storage devices, and the like.

The memory 1006 and storage medium 1010 can store any number and type of computer-executable instructions executed by the processor 1004 to implement the functions of the computer 1002 described herein. For example, the memory 1006 may include such applications as a web browser application and/or a mobile P2P payment system client application. These applications also typically provide a graphical user interface (GUI) on a display that allows the user to communicate with the computer 1002, and, for example a mobile banking system, and/or other devices or systems. In one embodiment, when the user decides to enroll in a mobile banking program, the user downloads or otherwise obtains the mobile banking system client application from a mobile banking system, or from a distinct application server. In other embodiments, the user interacts with a mobile banking system via a web browser application in addition to, or instead of, the mobile P2P payment system client application. Similarly, the memory 1006 and/or storage medium 1010 may be used to store data such as cached data, files for user accounts, user profiles, account balances, transaction histories, files downloaded or received from other devices, and any other data items.

The interconnect 1008 is representative of any type of circuitry to connect the components of the computer 1002. For example, the interconnect 1008 can include or represent, a system bus, a universal serial bus (USB) interface, a peripheral component interconnect (PCI), a Peripheral Component Interconnect-enhanced (PCIe), compute express link (CXL) interconnects, Universal Chiplet Interconnect Express (UCIe) interface, PCI-UCIe interconnects, an interface serial peripheral interconnects (SPIs), integrated interconnects (I2Cs), a high-speed interface connecting the processor 1004 to the memory 1006, individual electrical connections among the components, and electrical conductive traces on a motherboard common to some or all of the above-described components of the computer 1002. As discussed herein, the interconnect 1008 may operatively couple various components with one another, or in other words, electrically connects those components, either directly or indirectly—by way of intermediate component(s)—with one another.

The one or more input devices 1016 are representative of any type of input device for receiving input, such as a keypad, keyboard, touchscreen, touchpad, microphone, camera, fingerprint sensor, mouse, joystick, other pointer device, button, soft key, and the like. The one or more output devices 1018 are representative of any type of device for outputting information, such as a monitor, speaker, haptic feedback module, printer, and the like.

The computer 1002 may use the communications interface 1012 to communicate with one or more other devices 1024 via a network 1022. The communications interface 1012 allows the computer 1002 to communicate with and conduct transactions with other devices and systems, such as the other devices 1024. The communications interface 1012 may be a wired and/or a wireless interface. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communications interface 1012, which can be or include a radio-frequency transceiver, a Bluetooth device, Wi-Fi device, a Near-Field Communication (NFC) device, and other wireless transceivers. In addition, a positioning device 1014 such as a Global Positioning System (GPS) device may be included for navigation and location-related data exchanges, ingoing and/or outgoing. Wi-Fi networks use radio technologies called IEEE 802.11x (a, b, g, n, ac, ax, etc.) to provide secure, reliable, fast wireless connectivity. A Wi-Fi network connects computers to each other, to the Internet, and to wired networks (which use IEEE 802.3-related media and functions). Communications may also and/or alternatively be conducted via wired connections using the communications interface 1012, e.g., using USB, Ethernet, and other physically connected modes of data transfer. The network 1022 may be any one of, or the combination of, wired and/or wireless networks including without limitation a direct connection, a private network (e.g., an intranet), a public network (e.g., the Internet), a Personal Area Network (PAN), a Local Area Network (LAN), a Wide Area Network (WAN), a wireless network, a cellular network, and other communications networks.

The computer 1002 is configured to use the communications interface 1012 as, for example, a network interface to communicate with one or more other devices on a network such as network 1022. In this regard, the computer 1002 utilizes the wireless communications interface 1012 as an antenna operatively coupled to a transmitter and a receiver (together a "transceiver") included with the communications interface 1012. The communications interface 1012 is configured to provide signals to and receive signals from the transmitter and receiver, respectively. The signals may include signaling information in accordance with the air interface standard of the applicable cellular system of a wireless telephone network. In this regard, the computer 1002 may be configured to operate with one or more air interface standards, communication protocols, modulation types, and access types. By way of illustration, the computer 1002 may be configured to operate in accordance with any of a number of first, second, third, fourth, fifth-generation communication protocols and/or the like. For example, the as a smartphone, the computer 1002 be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The computer 1002 may also be configured to operate in accordance with non-cellular communication mechanisms, such as via a wireless local area network (WLAN) or other communication/data networks.

The communications interface 1012 may also include a payment network interface. The payment network interface may include software, such as encryption software, and hardware, such as a modem, for communicating information to and/or from one or more devices on a network. For example, the computer 1002 may be configured so that it can be used as a credit or debit card by, for example, wirelessly communicating account numbers or other authentication information to a terminal of the network. Such communication could be performed via transmission over a wireless communication protocol such as the NFC protocol.

The computer 1002 may be under the control of any suitable operating system (not pictured). Example operating systems include, but are not limited to, Linux® operating systems, UNIX®, Windows® operating systems, macOS®, iOS®, Android® and any other type of operating system.

The computer 1002 as illustrated diagrammatically represents at least one example of a possible implementation, where alternatives, additions, and modifications are possible for performing some or all of the described methods, operations, and functions. Although shown separately, in some embodiments, two or more computers 1002, systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

Aspects of the present disclosure are described herein with reference to flowchart illustrations and/or block diagrams of computer-implemented methods and computing systems according to embodiments of the disclosure. It will be understood that each block of the flowchart illustrations and/or block diagrams, and combinations of blocks in the flowchart illustrations and/or block diagrams, can be implemented by computer readable program instructions that may be provided to a processor of a computer or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts to carry out an embodiment.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present disclosure and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described to explain the principles of one or more aspects of the disclosure and the practical application, and to enable others of ordinary skill in the art to understand one or more aspects of the disclosure for various embodiments with various modifications as are suited to the particular use contemplated.

What is claimed is:

1. A method, comprising:

receiving, by an application executing on a processor, a natural language request;

determining, by a large language model (LLM) executing on the processor for each of a plurality of data sources, a respective data source configuration comprising: (i) a respective connection interface comprising a federated single sign-on or a credential-based login, and (ii) a respective indexing type of a plurality of indexing types, the plurality of indexing types comprising: tag-based indexing, keyword-based indexing, and metadata-based indexing;

generating, by the LLM for each data store source based on the natural language request, the respective connection interface, and the respective indexing type, a respective query comprising parameters and operators aligned to the respective indexing type, wherein the parameters comprise tag parameters for the tag-based indexing types, keyword parameters for the keyword-based indexing types, and metadata parameters for the metadata-based indexing types;

processing, by the application based on the configuration and the respective connection interface of the data sources, the queries against the plurality of data sources;

receiving, by the LLM based on the processing, a plurality of results from the plurality of data sources;

postprocessing, by the LLM, the plurality of results by: (i) structuring each result into a predetermined normalized schema, and (ii) generating an image or a video comprising a summary of a text of the respective result;

generating, by the LLM, a natural language response to the natural language request, the natural language response comprising an indication of a first result of the plurality of results and the image or the video of the first result; and outputting, by the application, the natural language response for display.

2. The method of claim 1, further comprising:

establishing a connection, by the application based on the connection interface, with a first data source of the plurality of data sources; and executing the query based on the indexing type for the first data source.

3. The method of claim 1, further comprising prior to generating the natural language response:

ranking, by the LLM, a subset of the plurality of results including the first result.

4. The method of claim 3, further comprising:

generating, by the LLM, a summary of the subset of the plurality of results, wherein the natural language response further comprises an indication of the summary of the subset and the image or the video generated for each result in the subset.

5. The method of claim 1, wherein the LLM comprises a text-based chatbot or a speech-based interactive voice response (IVR) agent.

6. The method of claim 1, further comprising:

determining, by the application, one or more metrics based on the queries and results, the metrics comprising search-term frequencies, no-result conditions based on whether the data source comprises content associated with the queries, and search-term effectiveness; and responsive to determining the no-result condition for a first data source of the plurality of data sources based on the first data source not including content associated with the query, generating, by the application a notification to add content to the first data source.

7. The method of claim 6, wherein the connection interfaces comprise single sign-on (SSO), Open Authorization 2.0 (OAuth2), Security Assertion Markup Language (SAML), Lightweight Directory Access Protocol (LDAP), and login and password.

8. A non-transitory computer-readable storage medium, the computer-readable storage medium including instructions that when executed by a processor, cause the processor to:

receive, by an application, a natural language request;

determine, by a large language model (LLM) and for each of a plurality of data sources, a respective data source configuration comprising: (i) a respective connection interface comprising a federated single sign-on or a credential-based login, and (ii) a respective indexing type of a plurality of indexing types, the plurality of indexing types comprising: tag-based indexing, keyword-based indexing, and metadata-based indexing;

generate, by the LLM for each data store source based on the natural language request, the respective connection interface, and the respective indexing type, a respective query comprising parameters and operators aligned to the respective indexing type, wherein the parameters comprise tag parameters for the tag-based indexing types, keyword parameters for the keyword-based indexing types, and metadata parameters for the meta-data-based indexing types;

process, by the application based on the configuration and the respective connection interface of the data sources, the queries against the plurality of data sources;

receive, by the LLM based on the processing, a plurality of results from the plurality of data sources;

postprocess, by the LLM, the plurality of results by: (i) structuring each result into a predetermined normalized schema, and (ii) generating an image or a video comprising a summary of a text of the respective result;

generate, by the LLM, a natural language response to the natural language request, the natural language response comprising an indication of a first result of the plurality of results and the image or the video of the first result; and output, by the application, the natural language response for display.

9. The computer-readable storage medium of claim 8, wherein the instructions further cause the processor to:

establish a connection, by the application based on the connection interface, with a first data source of the plurality of data sources; and execute the query based on the indexing type for the first data source.

10. The computer-readable storage medium of claim 8, wherein the instructions further cause the processor to prior to generating the natural language response:

rank, by the LLM, a subset of the plurality of results including the first result.

11. The computer-readable storage medium of claim 10, wherein the instructions further cause the processor to:

generate, by the LLM, a summary of the subset of the plurality of results, wherein the natural language response further comprises an indication of the summary of the subset and the image or the video generated for each result in the subset.

12. The computer-readable storage medium of claim 8, wherein the LLM comprises a text-based chatbot or a speech-based interactive voice response (IVR) agent.

13. The computer-readable storage medium of claim 8, wherein the instructions further cause the processor to:

determine, by the application, one or more metrics based on the queries and results, the metrics comprising search-term frequencies, no-result conditions, and search-term effectiveness; and responsive to determining a no-result condition associated with a first data source of the plurality of data sources, generate, by the application, a notification to add content to the first data source.

14. The computer-readable storage medium of claim 13, wherein the connection interfaces comprise single sign-on (SSO), Open Authorization 2.0 (OAuth2), Security Assertion Markup Language (SAML), Lightweight Directory Access Protocol (LDAP), and login and password.

15. An apparatus, comprising:

a processor; and a memory storing instructions that, when executed by the processor, cause the processor to:

receive, by an application, a natural language request;

determine, by a large language model (LLM) for each of a plurality of data sources, a respective data source configuration comprising: (i) a respective connection interface comprising a federated single sign-on or a credential-based login, and (ii) a respective indexing type of a plurality of indexing types, the plurality of indexing types comprising: tag-based indexing, keyword-based indexing, and metadata-based indexing;

generate, by the LLM for each data store source, based on the natural language request, the respective connection interface, and the respective indexing type, a respective query comprising parameters and operators aligned to the respective indexing type, wherein the parameters comprise tag parameters for the tag-based indexing types, keyword parameters for the keyword-based indexing types, and metadata parameters for the metadata-based indexing types;

process, by the application based on the configuration and the respective connection interface of the data sources, the queries against the plurality of data sources;

receive, by the LLM based on the processing, a plurality of results from the plurality of data sources;

postprocess, by the LLM, the plurality of results by: (i) structuring each result into a predetermined normalized schema, and (ii) generating an image or a video comprising a summary of a text of the respective result;

generate, by the LLM, a natural language response to the natural language request, the natural language response comprising an indication of a first result of the plurality of results and the image or the video of the first result; and output, by the application, the natural language response for display.

16. The apparatus of claim 15, wherein the instructions further cause the processor to:

establish a connection, by the application based on the connection interface, with a first data source of the plurality of data sources; and execute the query based on the indexing type for the first data source.

17. The apparatus of claim 15, wherein the instructions further cause the processor to prior to generating the natural language response:

rank, by the LLM, a subset of the plurality of results including the first result.

18. The apparatus of claim 17, wherein the instructions further cause the processor to:

generate, by the LLM, a summary of the subset of the plurality of results, wherein the natural language response further comprises an indication of the summary of the subset and the image or the video generated for each result in the subset.

19. The apparatus of claim 15, wherein the instructions further cause the processor to:

determine, by the application, one or more metrics based on the queries and results, the metrics comprising search-term frequencies, no-result conditions, and search-term effectiveness; and responsive to determining a no-result condition associated with a first data source of the plurality of data sources, generate, by the application, a notification to add content to the first data source.

20. The apparatus of claim 19, wherein the connection interfaces comprise single sign-on (SSO), Open Authorization 2.0 (OAuth2), Security Assertion Markup Language (SAML), Lightweight Directory Access Protocol (LDAP), and login and password.

* * * * *